United States Patent [19]
Nakajima et al.

[11] Patent Number: 5,491,557
[45] Date of Patent: Feb. 13, 1996

[54] IMAGE FORMING APPARATUS HAVING A MEMORY AND TWO OPERATING MODES, AND METHOD OF USING SAME

[75] Inventors: Akio Nakajima, Toyokawa; Munehiro Nakatani, Toyohashi; Hideo Muramatsu, Shinshiro, all of Japan

[73] Assignee: Minolta Camera Kabushiki Kaisha, Osaka, Japan

[21] Appl. No.: 995,057

[22] Filed: Dec. 22, 1992

[30] Foreign Application Priority Data

Dec. 27, 1991 [JP] Japan ................... 3-345945
Dec. 27, 1991 [JP] Japan ................... 3-345946

[51] Int. Cl.$^6$ .................................. H04N 1/21
[52] U.S. Cl. ........................... 358/296; 355/202
[58] Field of Search ........................ 355/202, 313; 358/401, 296, 444, 468, 404, 437

[56] References Cited

U.S. PATENT DOCUMENTS

| | | | |
|---|---|---|---|
| 4,907,094 | 3/1990 | Mishima et al. | 358/437 |
| 5,198,865 | 3/1993 | Haneda et al. | 355/326 |
| 5,253,077 | 10/1993 | Hasegawa et al. | 358/404 |
| 5,270,830 | 12/1993 | Suzuki | 358/400 |

FOREIGN PATENT DOCUMENTS 3-119484  5/1991  Japan .

Primary Examiner—Peter S. Wong
Assistant Examiner—Randy W. Gibson
Attorney, Agent, or Firm—Burns, Doane, Swecker & Mathis

[57] ABSTRACT

An image forming apparatus comprises a document transport mechanism for transporting a document to a reading station, an image reading unit for reading an image of the document at the reading station and for outputting image data descriptive of the image of the document, a image forming unit for performing an image formation based on the image data, a memory for storing the image data, a data writing unit for transferring and writing the image data to the memory, and a data reading unit for reading the image data from the storage means in readiness for a transfer of the image data to the image forming unit. A control unit is provided for controlling a data write operation, performed by the data writing unit, and a data read operation, performed by the data reading unit, so as to be accomplished independently and in parallel relation with each other.

8 Claims, 34 Drawing Sheets

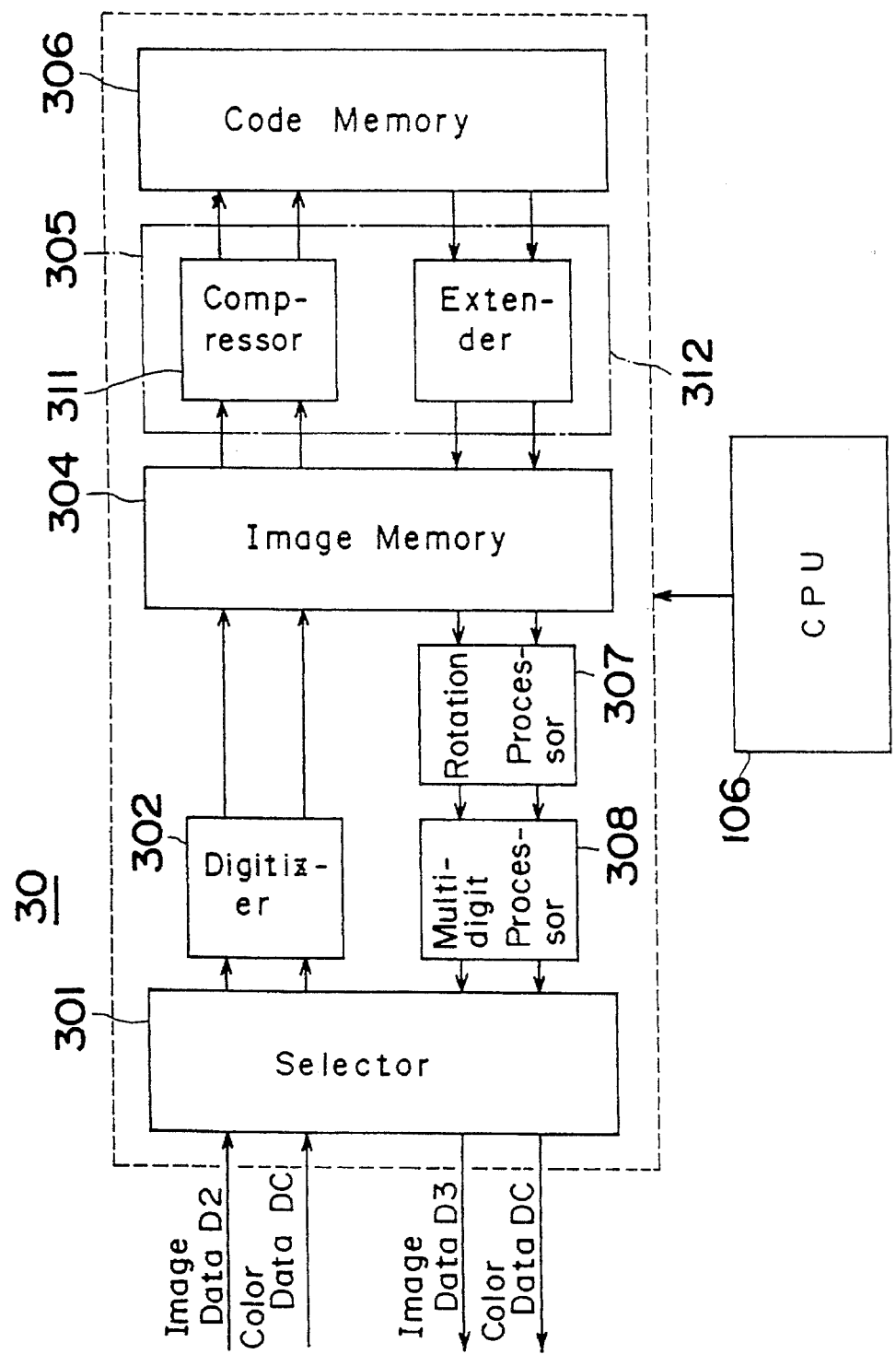

| Mode<br>Signal | Memory Mode | | Direct-<br>coupled<br>Mode | Mixed<br>Mode |
| --- | --- | --- | --- | --- |
| | Write | Read | | |
| SG1 | A | N | N | A |
| SG2 | N | N | A | A |
| SG3 | N | A | N | N |
| SG4 | A | X | A | A |
| SG5 | X | A | A | A |

A : active    N : Inactive    X : Indefinite

Fig. 8(a)
| Area | Page | Pre-coupled | Post-coupled | Added Info. |
|------|------|-------------|--------------|-------------|
| 00 | 1 | 00 | 01 | |
| 01 | 1 | 01 | FF | |
| 02 | 2 | 00 | 03 | |
| 03 | 2 | 03 | FF | |
| ⋮ | | | | |
MT1
Fig. 8(b)
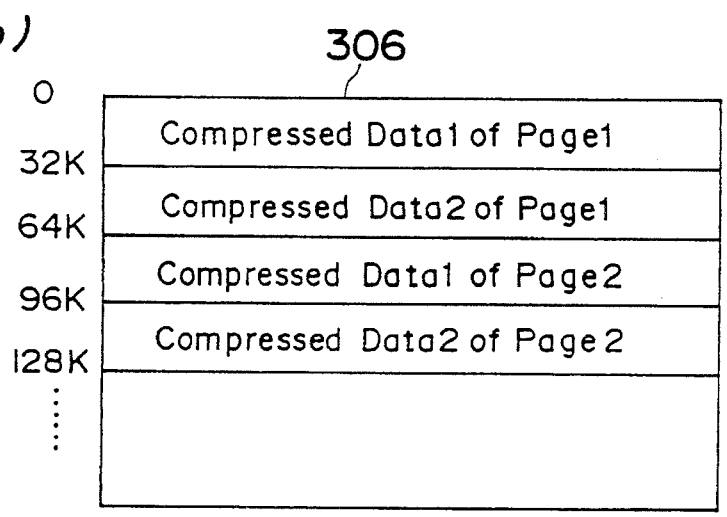
Fig. 9
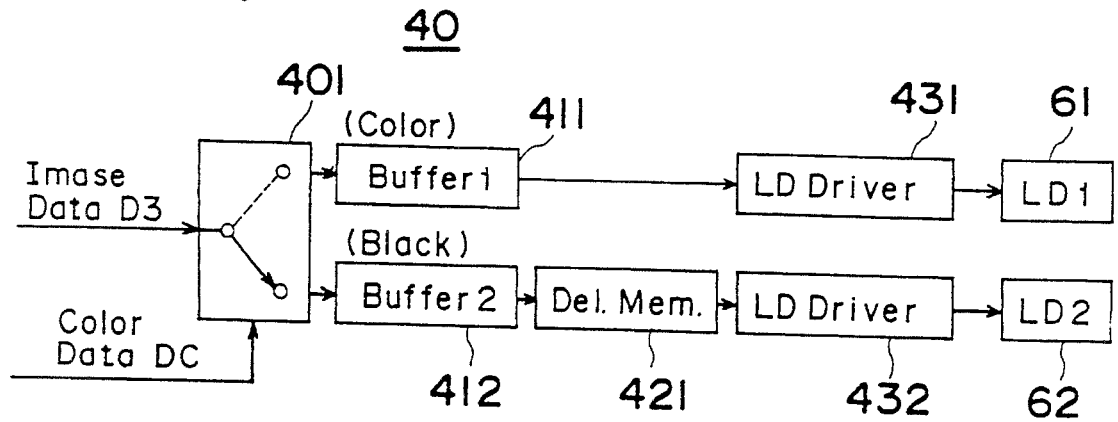

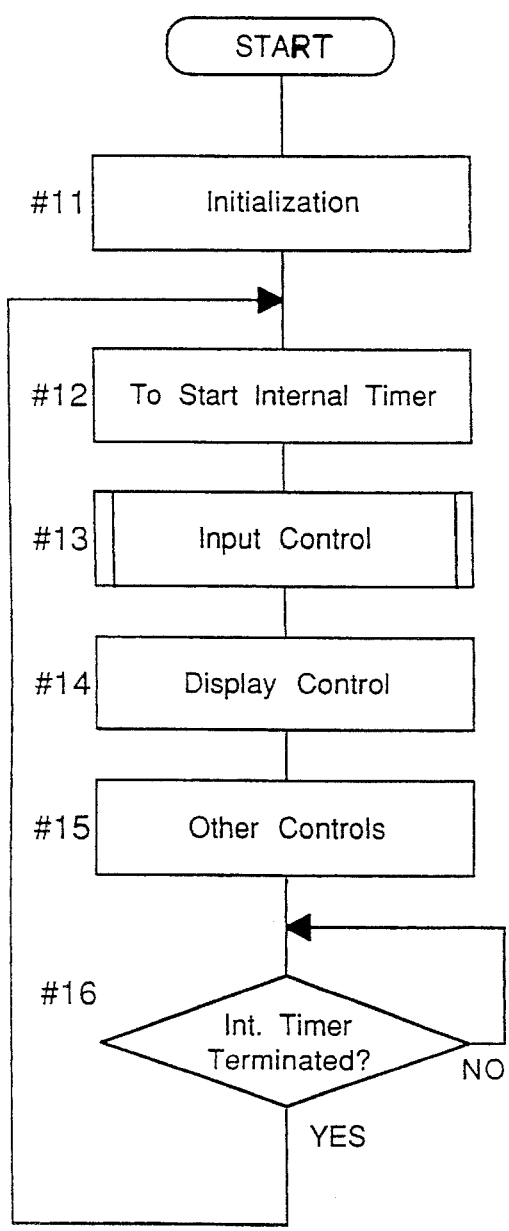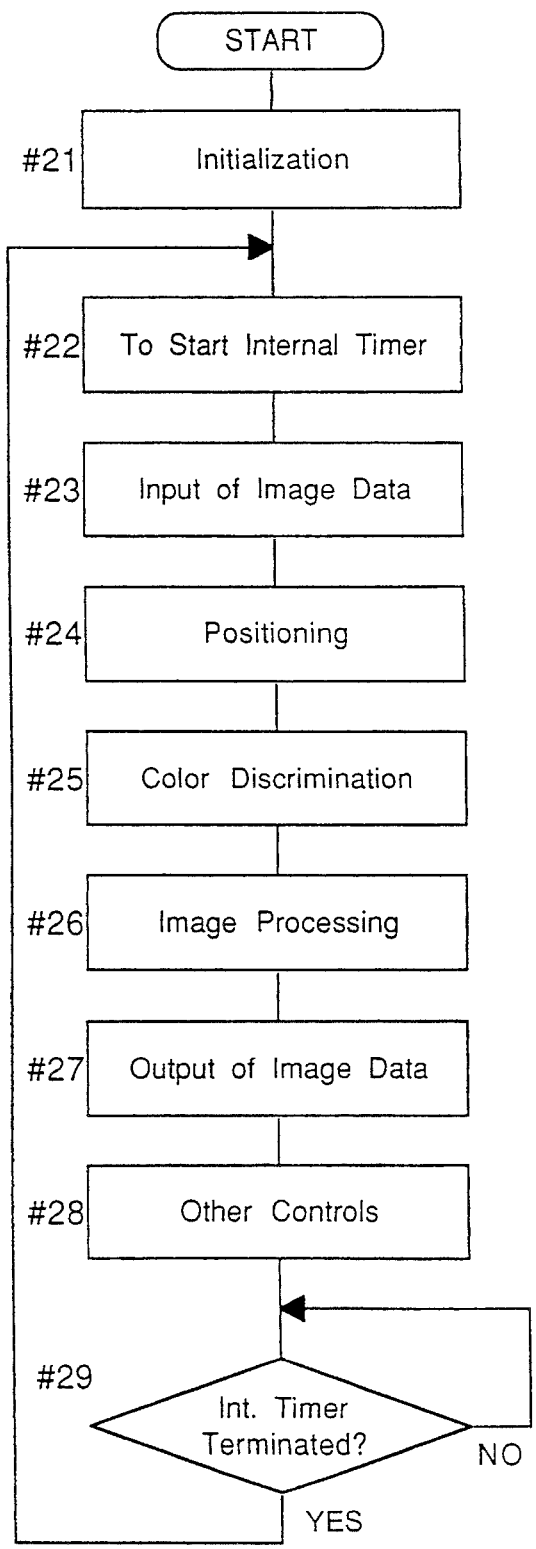

IMAGE FORMING APPARATUS HAVING A MEMORY AND TWO OPERATING MODES, AND METHOD OF USING SAME

BACKGROUND OF THE INVENTION

1. Field of the Invention

The present invention relates generally to an electrophotographic copying machine and, more particularly, to the electrophotographic copying machine comprising an image reader unit for reading an image of a document to be copied, a printer unit for the formation of an image and an image storage unit for the storage of the image.

2. Description of Related Art

In general, a digital copying machine has a capability of storing in a memory an image data read by an image sensor such as CCD and, therefore, the copying machine is capable of executing a so-called memory mode copying operation. The memory mode copying operation refers to the operation in which, in case of multiple copying, the document is read only one time and the read image data is then stored in the memory so that the image data stored is repeatedly read from the memory to form a required number of copies. As compared with an analog copying machine which operates only under a direct-coupled mode, the digital copying machine of the type referred to above is advantageous in that the number of times over which the document is read is reduced, permitting an increase in copying speed.

Also, during the memory mode copying operation, rotation of the direction of the document is turned 90 degrees while stored in the memory enables a memory sorting with no need to use any mechanical sorting machine.

Most of the copying machine have a capability of selecting a plurality of modes for making a double-sided copy from a single-sided document, a double-sided copy from a double-sided document, a single-sided copy from a double-sided document, a synthesized copy in which two documents are reproduced on a single recording paper and a combination of one of them with a multi-copy.

During the execution of any of those modes, for example, a double-sided copy mode, a recording paper having one of first and second opposite sides which has been copied must be temporarily accommodated in an intermediate tray or the like and is then turned upside down, whereupon the recording paper is supplied again to a transfer station. Also, in order to accomplish a double-sided document mode, the document, one side of which has been read, must be transported within an automatic document feeder and is then turned upside down.

In the prior art digital copying machine, during the execution of the mode in which a double-sided copy is made for each of a plurality of double-sided documents, the documents are sequentially read in the order from the first side of the first, the second side of the first, the first side of the second, the second side of the second and so on, so that the image read from the documents can be formed during the reading of the image of the next succeeding document.

Accordingly, in order for the copying of the second side of the document to be initiated subsequent to the copying of the first side of the document, each document must be turned upside down and a wait must be made until the associated recording paper is also turned upside down.

Because of this, in the prior art copying machine, the interval between the neighboring cycles of image formation tends to be lengthened and, therefore, a substantial length of time is required to complete the copying of the whole number of pages and, hence, the copying machine as a whole is susceptible to a reduced copying speed.

Also, in the digital copying machine, it has been practiced that, in order for the image data to be highly efficiently stored, the image data read is compressed to provide a code data which is in turn stored, so that, when the necessity arises, the code data is expanded at a timing different from the timing of compression to restore to the image data.

Where the memory mode copying is carried out with this type of prior art digital copying machine, after the whole number of the documents have been read and compressed and after the code data has been completely stored in the memory, the image data are sequentially read from the memory and are expanded in readiness for reproduction onto copying papers.

Also, where the multi-copy is carried under the memory mode for making a copy for each double-sided document, after the whole number of the documents have been read and subsequently stored in the memory, the image data are sequentially read from the memory and are then reproduced on copying papers.

Because of the foregoing, a prolonged length of time is required to complete the copying of the whole number of the documents, rendering the copying speed as a whole to be low.

SUMMARY OF THE INVENTION

The present invention has for its primary object to provide an improved image forming apparatus wherein the length of time required to perform functions other than the image formation is reduced as much as possible thereby to increase the copying speed as a whole.

It is a related object of the present invention to provide an image data processing method executed in the image forming apparatus of the type referred to above.

Another important object of the present invention is to provide an improved image forming apparatus wherein the reduction of the length of time required to perform functions other than the image formation is accomplished by switching one of image data processing schemes to another during the image formation.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 6 is a circuit block diagram showing a storage unit used in the copying machine;

FIGS. 7(a) and 8(b) are a circuit block diagram showing a selector employed in the storage unit of FIG. 6;

FIGS. 8(a) and 8(b) are a diagram showing a relationship between a management table and a code memory;

FIG. 9 is a circuit block diagram showing a print processing unit employed in the copying machine;

FIG. 21 is a flowchart showing a main routine executed by a central processing unit 101;

FIG. 22 is a flowchart showing a main routine executed by a central processing unit 102;

DETAILED DESCRIPTION OF THE EMBODIMENTS

Figure 1:
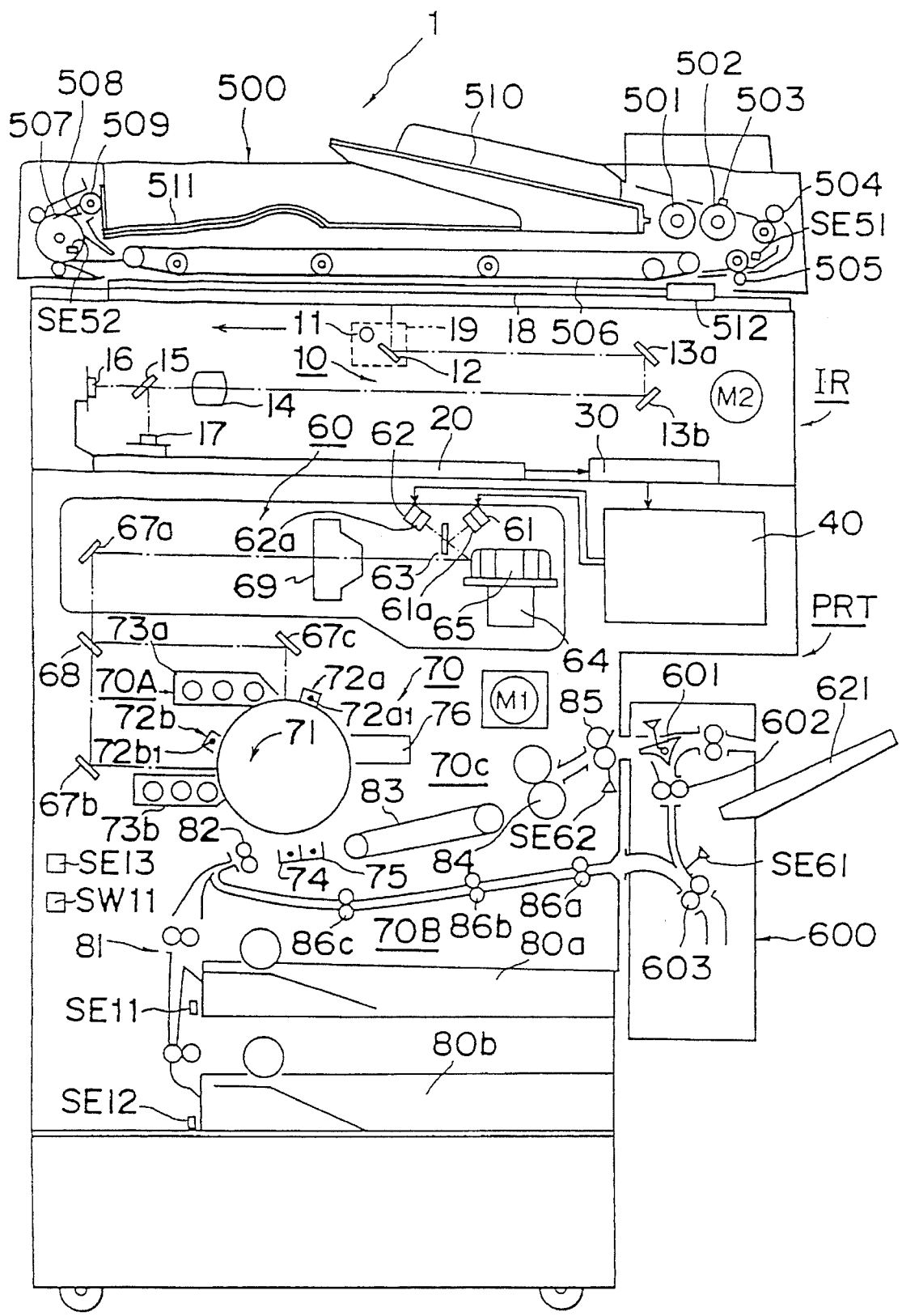
FIG. 1 is a front sectional view of a copying machine embodying the present invention, showing the entire structure thereof.
Figure 2:
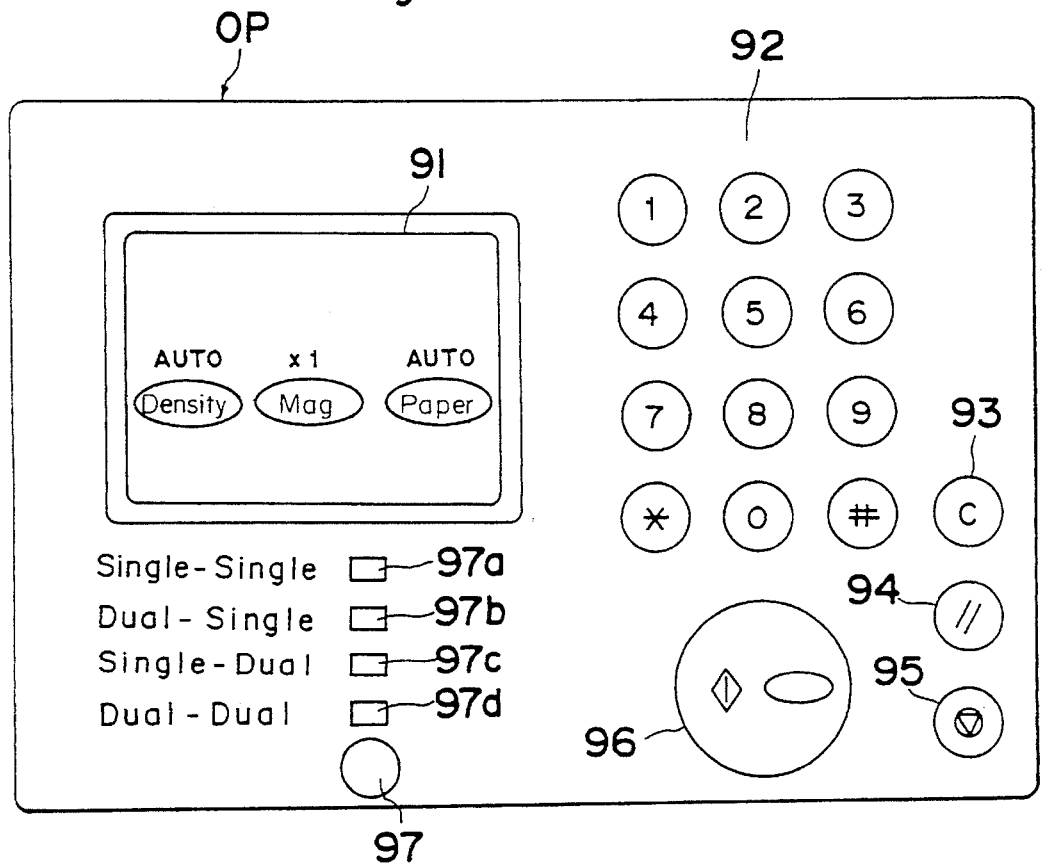
FIG. 2 is a front elevational view of an operating panel used in the copying machine.

Referring to FIGS. 1 and 2 which illustrate the entire structure of an electrophotographic copying machine 1 and an operating panel structure OP employed therein, respectively, the electrophotographic copying machine 1 shown therein comprises a scanning system 10 for reading an image of a document to be copied and for converting it into an image signal; an image signal processing unit 20 for processing the image signal received from the scanning system 10; a storage unit 30 for selecting one of an output mode, in which an image data inputted from the image signal processing unit 20, is directly outputted to a printer, and a storage mode in which the image data inputted from the image signal processing unit 20 is stored; a print processing unit 40 for driving semiconductor lasers 61 and 62 according to the image data inputted from the storage unit 30; an optical system 60 for guiding respective beams from the semiconductor lasers 61 and 62 towards different positions on a photoreceptor drum 71; an image forming system 70 for developing an electrostatic latent image, formed as a result of exposure, into a powder image and for transferring the powder image onto a recording paper at a transfer station to form a permanently fixed image; an operating panel structure OP disposed atop the machine housing; a document transport unit 500 for transporting the document and also for inverting the document upside down if required; and a paper recirculating unit 600 for supplying the recording paper again towards the transfer station.

It is to be noted that, in the copying machine 1, the scanning system 10 and the image signal processing unit 20 constitute an image reader IR and the print processing unit 40, the optical system 60 and the image forming system 70 constitute a printer PRT.

The scanning system 10 includes an exposure lamp 11 and a first mirror 12, both mounted on a scanner 19 movable beneath a transparent document support 18, second and third mirrors 13a and 13b, a condenser lens 14, a dichroic mirror 15, photoelectric elements 16 and 17 each employed in the form of a CCD array or the like, and a scan motor M2.

The dichroic mirror 15 is of a type capable of reflecting a specific color portion, for example, a red light component, of the rays of light reflected from the document, but allowing the passage of another portion of the reflected rays of light which is in a color complemental to the color of the specific color portion. The photoelectric elements 16 and 17 are operable to individually convert into respective electric signals an image in non-specific color, which is mainly black, and an image in specific color (i.e., red).

The image signal processing unit 20 is operable to process image signals outputted respectively from the photoelectric elements 16 and 17 to discern each of picture elements of the image of the document between the specific color (second color) and a color (first color) other than the specific color and for outputting an image data including color data to the storage unit 30. The structure and the function of the storage unit 30 will be described later.

The print processing unit 40 serves to sort the image data including the color data to any one of semiconductor lasers 61 and 62 according to the image data including the color data supplied from the image signal processing unit 20, and also to delay the image data to be applied to one of the semiconductor lasers, that is, the semiconductor laser 62, in dependence on a difference in exposure position corresponding to the semiconductor lasers 61 and 62.

The optical system 60 includes, in addition to the semiconductor lasers 61 and 62, a dichroic mirror 63 for combining together laser beams emerging from the respective semiconductor lasers 61 and 62, to provide a composite laser beam, a polygonal mirror 65 for deflecting the composite laser beam, a primary lens 69, a reflecting mirror 67a, a dichroic mirror 68 for separating the composite laser beam into two laser beams corresponding to those generated from the semiconductor lasers 61 and 62, reflecting mirrors 67b and 67c and other elements.

The image forming system 70 comprises a developing and transfer system 70A, a transport system 70B and a fixing system 70C. The developing and transfer system 70A includes, in addition to the photoreceptor drum 71 supported for rotation in a counterclockwise direction as viewed in FIG. 1, a first electrostatic charger 72a, a first developing device 73a, a second electrostatic charger 72b, a second developing device 73b, a transfer charger 74, a separator charger 75 and a cleaning unit 76, all arranged in this order in a direction conforming to the direction of rotation of the photoreceptor drum 71.

The first developing device 73a accommodates therein a mass of two-component developing material comprised of red toner corresponding to the second color and carrier particles, whereas the second developing device 73b accommodates therein a mass of two-component developing material comprised of black toner corresponding to the first color and carrier particles.

The transport system 70B includes paper cassettes 80a and 80b accommodating therein respective batches of recording papers, paper size sensors SE11 and SE12, a paper guide 81, a timing roller 82, a transport belt 83, and horizontal transport rollers 86a, 86b and 86c for transporting a recording paper which has been loaded from the paper recirculating unit 600.

The fixing system 70C includes a pair of juxtaposed fixing rolls 84 for heating the recording paper while transporting the latter therethrough, a discharge roller 85 and a discharge sensor SE62 for detecting the discharge of the recording paper.

The paper recirculating unit 600 is operable to temporarily accommodate recording papers discharged by the discharge roller 85, and to reverse each recording paper upside down during a dual copy mode before delivering it onto the horizontal transport roller 86a of the transport system 70B or to subsequently deliver each recording paper onto the horizontal transport roller 86a of the transport system 70B during a composite copy mode so that an image formation (print) can be effected again. The paper recirculating unit 600 includes a switching pawl 601 for selectively directing the recording paper towards a recovery tray 621 or to a recirculation path, a transport roller 602, an invertor roller 603, and a reverse sensor SE61.

During the dual copy mode, the switching pawl 601 is driven by a solenoid (not shown) so that a left end portion of the switching pawl 601 is moved upwardly thereby to guide the recording paper, discharged by the discharge roller 85, to be guided towards the transport roller 602 so as to reach the invertor roller 603. When a trailing end of the recording paper moves past the reverse sensor SE61, the invertor roller 603 inverts to guide the recording paper towards the horizontal transport roller 86a and then towards the timing roller 82 past the horizontal transport rollers 86b and 86c. At this time, the next succeeding recording papers are successively transported at predetermined intervals, and the number of the recording papers each having one side copied with images can wait depends on the length of each recording paper provided no image data is delayed.

The document transport unit 500 is operable to automatically transport the document, placed on a document tray 510, onto the transparent document support 18 and then to eject it onto a recovery table 511 after the image of the document has been read out by the scanner 19. This document transport unit 500 includes a paper supply roller 501, a shuffling roller 502, a shuffling pad 503, an intermediate roller 504, a registering roller 505, a transport belt 506, an invertor roller 507, a switching pawl 508, a discharge roller 509, a document supply tray 510, a recovery table 511, a document scale 512, a paper supply sensor SE51, and a paper discharge sensor SE52.

The function of the document transport unit 50 varies with a document reading mode. The document reading mode includes a scan mode, in which the document is read by a scanning operation of the scanner 19, and a panning mode in which, while the scanner 19 is held still, the document is transported while being read by the scanner 19. Accordingly, the document transport unit 500 has capabilities of operating under one of single-side scan mode (often referred to as a single-side mode), a single-side panning mode and a double-side panning mode, depending on whether only one of the opposite sides of each document is read or whether both of the opposite sides of each document are read.

During the single-side mode, one or a plurality of documents are placed on the document supply tray 510 with one side to be read oriented upwards. In operation, the documents placed on the document supply tray 510 are successively transported by the paper supply roller 501 in the order from the lowermost one of them and the document is then shuffled by the shuffling roller 502 and the shuffling pad 503. Thereafter, the document is transported past the intermediate roller 504 towards the registering roller 505 by which the position of the document being transported is rectified before it is eventually transported by means of the transport belt 506 to a position immediately above the document transport 18. Immediately after a trailing end of the document with respect to the direction of transport thereof has moved past a left end of the document scale 512, the transport belt 506 is slightly reversed and is then stopped. In this way, a right-hand end (a trailing end) of the document is brought into abutment with an end edge of the document scale 512, thereby positioning the document accurately on the document support 18. At this time, a leading end of the next succeeding document is brought to the registering roller 505 and, therefore, the length of time required to transport the next succeeding document can be reduced.

With the document so positioned on the document support 18, the scanner 19 undergoes a scanning movement to scan the side of the document oriented downwards. After this document reading, the document is transported leftwards by means of the transport belt 506 and subsequently turned backwards by the invertor roller 507 and finally discharged onto the recovery table 511 by means of a discharge roller 509 after having passed upwardly of the switching pawl 508. The document so discharged onto the recovery table 511 is placed thereon in such a manner that the side of the document which has been-scanned is oriented upwards.

The single-side panning mode will now be described. The single-side panning mode is available when, for example, a single-side copy is desired and performs a function in operatively associated relationship with the scanning system 10. More specifically, the process until the document passes the registering roller 505 is substantially identical with that taking place during the single-side mode discussed above. However, after the document has been transported past the registering roller 505, the document is transported by the transport belt 506 at a predetermined speed appropriate to a selected magnification at which the copying is made, and is subsequently discharged onto the recovery tray 511 by way of the invertor roller 507 and others. During this movement, the scanner 19 is held still at a position adjacent a right-hand end of the document support 18 and, as the document moves above the scanner 19, the side of the document being transported is read by the scanner 19.

Thus, during the single-side panning mode, the reversal and positioning of the document and the scanning and return of the scanner, both occurring during the single-side mode, do not occur and, therefore, the document reading takes place at a high speed.

The double-side panning mode is the mode in which, although the process up until the document is read is substantially identical with that taking place during the single-side panning mode discussed above, the switching pawl 508 is driven with its left end oriented upwards during the process and, therefore, the document being transported after the side thereof has been read is, after having been turned backwards by the invertor roller 507, moved beneath the switching pawl 508 and is then guided beneath the transport belt 506 with its side turned upside down. At this time, the scanner 19 is moved leftwards when the document reading has been completed and waits at an opposite side reading position corresponding to the length of the document.

The opposite side reading position referred to above is the position where, when the document is turned backwards by the invertor roller 507, the leading and trailing ends of the document, which are opposite to each other, align with each other, that is, the position somewhat spaced rightwards from the position at which the length having circulated around the invertor roller 507 matches with the length of the document. Accordingly, the opposite side reading position varies with the length of the document to be copied, but in the event that the leading and trailing ends of the document on the document support 18 does not match with each other since the document being read is short, a left-hand end of the document support 18 defines the opposite side reading position. It is to be noted that the length of the document being transported is detected by the paper supply sensor SE51.

The document having been guided again to the position beneath the transport belt 506 is transported by the transport belt 506, then reversed, a rightwards direction at a predetermined speed appropriate to the selected magnification at which the copying is made, and, during the transport, the document moves above the scanner 19 held at the opposite side reading position, thereby to accomplish a reading of the other side of the document being transported.

When the reading of the other side of the document is completed, the transport belt 506 is reversed to allow the document to be transported leftwards, and the document having been inverted by the invertor roller 507 is guided again by the transport belt 506 towards a position below the transport belt 506 and is then transported rightwards. After the document so transported rightwards arrives at a position with the left end thereof aligned with the transport belt 506, the document is transported leftwards again and then moves past the invertor roller 507 and above the switching pawl 508, finally being discharged by the discharge roller 509 onto the recovery tray 511 with the side of the document oriented upwards.

A copying machine 1a having document reading units 10a and 10b dedicated respectively to read opposite sides of a document to be copied, unlike the scanning system 10 of the copying machine 1, will now be described briefly.

Figure 3:
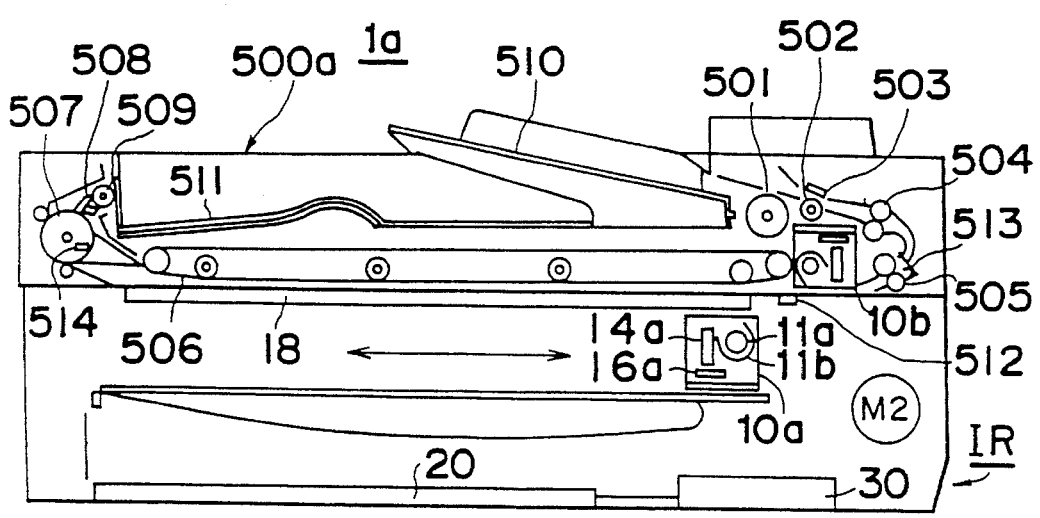
FIG. 3 is a front sectional view of a portion of the copying machine which may be modified according to the present invention.

FIG. 3 is a schematic side sectional view showing an essential portion of the copying machine 1a according to another embodiment. As shown therein, each of the document reading units 10a and 10b employed in the copying machine 1a includes an exposure lamp 11a for illuminating the document, a lamp guide 11b, a SELFOC-trademarked lens array 14a and a photoelectric element 16a in the form of a contact-type CCD image sensor. The document reading unit 10a is dedicated to read one of the opposite sides of the document, hereinafter referred to as a front side, and is capable of scanning beneath the document transport 18. On the other hand, the document reading unit 10b is dedicated to read the other of the opposite sides of the document, hereinafter referred to as a rear side, and is fixedly disposed immediately after the registering roller 505 within a document transport unit 500a.

During the single-side panning mode performed by the copying machine 1a, the document reading unit 10a is held still at the position where the scanner 19 occupies during the single-side panning mode performed by the copying machine 1, and the document is transported thereabove so that the document can be read. On the other hand, during the single-side scanning mode, after the document has been transported onto and positioned on the document support 18, the document reading unit 10a scans leftwards to read the document.

During the double-side panning mode, the rear side of the document is read by the document reading unit 10b immediately after the passage of the document past the registering roller 505 and, subsequently, the front side of the document is read by the document reading unit 10a in a manner similar to that accomplished during the single-side scanning mode.

When the front and rear sides of the document are read in the manner described above, the document reading units 10a and 10b are operated on a time-sharing basis and, therefore, it suffices that an image signal from an associated photoelectric element 16a be outputted having been switched over by a switching circuit. Accordingly, a processing circuit of the image signal processing unit 20 may be of a single system.

Referring again to FIG. 2, the operating panel structure OP includes a liquid crystal touch panel 91, a plurality of numeric keys 92 for inputting a numeric value and/or a magnification factor, a clear key 93 for resetting the inputted number to a standard number "1", a panel reset key 94 for resetting various preset values back to respective standard values, a stop key 95 for stopping an copying cycle, a start key 96 for initiating the copying cycle, a mode selector key 97 for selecting a copy mode, and a plurality of mode indicators 97a, 97b, 97c and 97d for providing visual displays of the copy mode.

The liquid crystal touch panel 91 is used to provide visual indications of various conditions occurring in the copying machine 1 such as, for example, the occurrence of a jamming condition, the query of servicing personnel and the occurrence of a paper empty condition, of various operating modes of the copying machine 1 such as, for example, an exposure level, magnification and papers and of other useful information and also to input a selection of one of the various modes.

Figure 4:
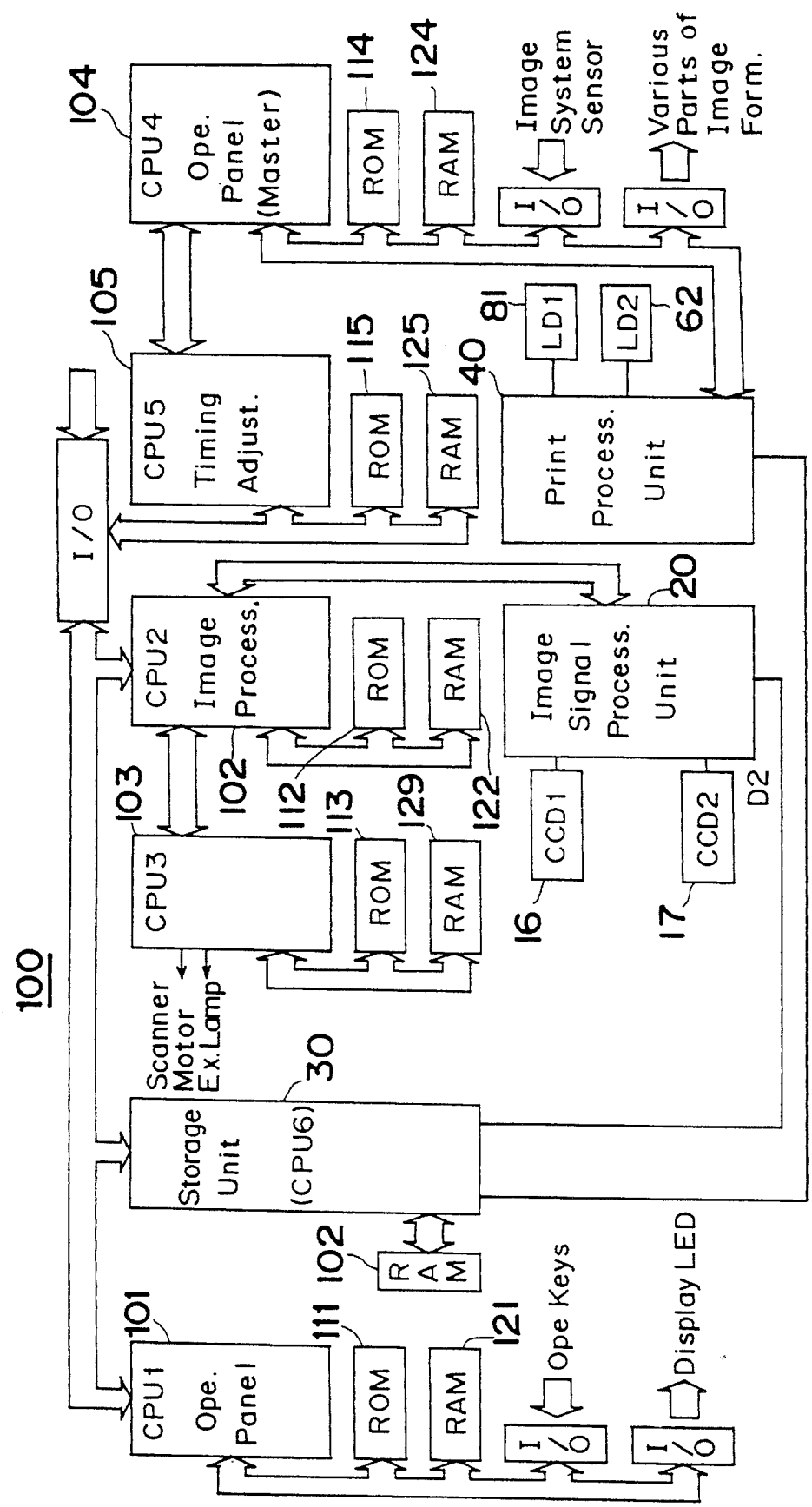
FIG. 4 is a circuit block diagram showing the structure of a control unit employed in the copying machine.
Figure 5:
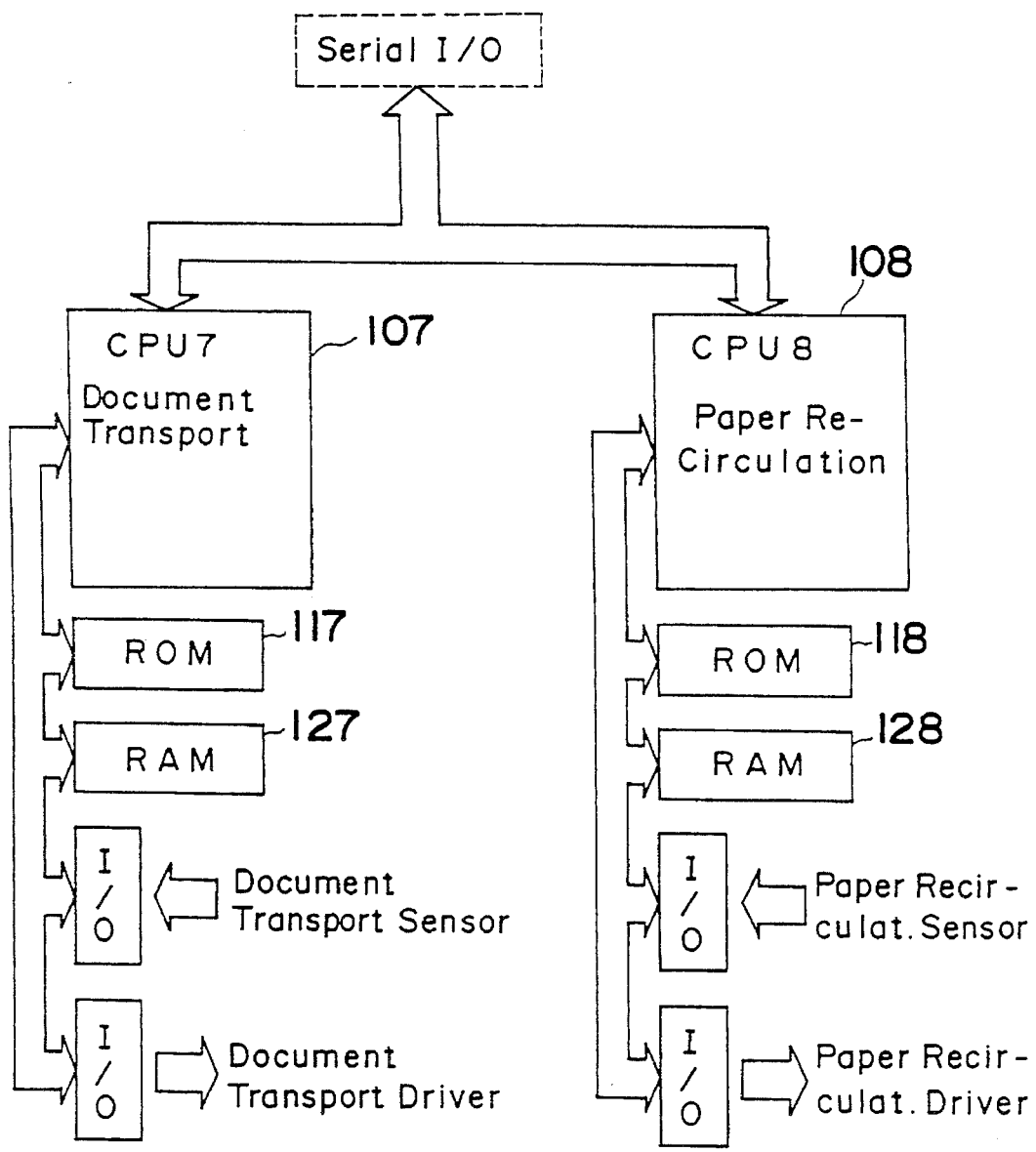
FIG. 5 is a circuit block diagram showing the structure of another control unit employed in the copying machine.

Hereinafter, a control unit 100 will be described with particular reference to FIGS. 4 and 5. A plurality of, for example, eight, central processing units (CPU) 101 to 108 form the heart of the control unit 100, and each of the central processing units 101 to 108 includes a respective read-only memory (ROM) 111 to 118 for the storage of a program and a respective random access memory (RAM) 121 to 128 which serves as a work area for the associated program. Of the central processing units, the central processing unit 106 is provided within the storage unit 30 as best shown in FIG. 6.

The central processing unit 101 controls the inputting and the display of signals fed from various operating keys on the operating panel structure OP. The central processing unit 102 controls various portions of the image signal processing unit 20, and the central processing unit 103 control the drive of the scanning system 10. The central processing unit 104 control the print processing unit 40, the optical system 60 and the image forming system 70, and the central processing unit 105 performs a process associated with a timing adjustment of the entire control unit 100 and the setting of the various operating modes.

The central processing unit 106 controls the storage unit 30 to cause read image data to be temporarily stored in a memory (image memory 304) and to subsequently output the image data to the print processing unit 40. In this way, the image reader IR and the printer PRT are independently controlled to enhance the copying speed as described in detail later.

The central processing unit 107 controls the document transport unit 500, and the central processing unit 108 controls the paper recirculating unit 600. Among those central processing units 101 to 108, a serial communication by interruption is carried out to transact commands, reports and other data.

Various processing units for processing the image data will be described hereinafter.

The image signal processing unit 20 includes an analog-to-digital converter, a shading corrector, a color discriminator for discriminating the color of picture elements of the document on the basis of the image data, a magnification processing unit and an image quality corrector.

Image signals inputted from photoelectric elements 16 and 17 are quantified by the image signal processing unit 20 into 8-bit image data for each picture element and are, after having been processed, outputted therefrom as image data D2. At the same time, a 1-bit color data DC indicative of whether or not it is a designated specific color is outputted in correspondence with each of the picture elements of the image data D2.

Figures 7A, 7B:
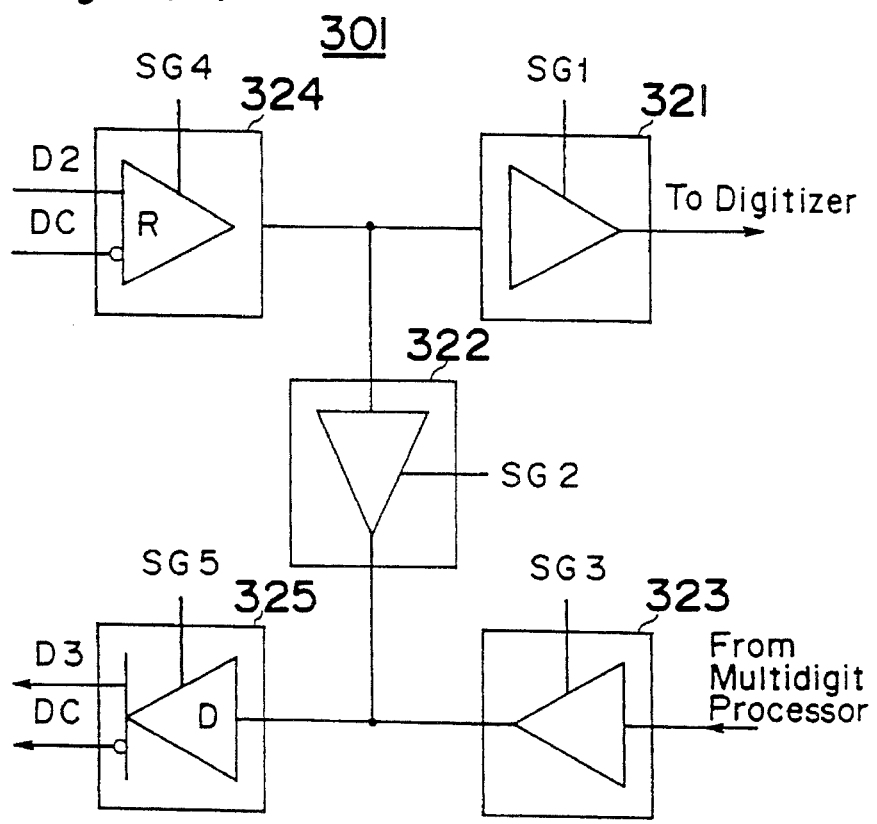

FIG. 6 illustrates storage unit 30 in a block circuit representation and FIGS. 7(a) and 7(b) illustrate a block circuit diagram of a selector 301 included in the storage unit 30. Referring to FIGS. 6, 7(a) and 7(b), the storage unit 30 includes, in addition to the selector 301, a digitizer 302 for formulating a binary data on the basis of a parameter setting from the central processing unit 106, a multi-port image memory 304 having a capacity corresponding to 2 pages of A4-size papers at 400 dpi, a code processor 305 including a compressor 311 and an extender 312 that are operable independently from each other, a multi-port code memory 306 having a plurality of ports; a rotation processor 307, a multi-digit processor 308 for formulating a multi-digit data on the basis of a parameter setting from the central processing unit 106, and a central processing unit 106 for controlling the entire components of the storage unit 30.

The selector 301 comprises, as shown in FIG. 7(a), five bus gates 321 to 325 capable of being selectively switched on and off in response to respective control signals SG1 to SG5 applied thereto. As shown in FIG. 7(b), each of the control signals SG1 to SG5 has one of active and inactive states A and N depending on the operating mode and, therefore, the state of connection of the selector 301 is determined by a combination of the respective states of the control signals SG1 to SG5 thereby to control the flow of the image data.

The code processor 305 is, when the image data D2 is written in the image memory 304, operable to read it out from the image memory 304 and then to compress it to provide a code data which is subsequently written in the multi-port code memory 306. Also, in response to a command from the central processing unit 106, the code processor 305 read the code data from the code memory 306 and then expand it to provide an image data which is subsequently written in the image memory 304.

When as a result of the expansion the image data corresponding to one page in capacity is formulated in the image memory 304, it is then read out and is subsequently subjected to a rotation process in the rotation processor 307 and, thereafter, a multi-digit image data is formulated by the multi-digit processor 308, which is subsequently outputted as an image data D3. It is to be noted that the compressor 311 and the extender 312 are operable independently and parallel and data are DMA-transmitted by DMAC (not shown) between the code memory 306 and each of the compressor 311 and the extender 312.

The code memory 306 is managed by a management table MT1 stored in a random access memory (RAM) 126. FIGS. 8(a) and 8(b) illustrate a relationship between the management table MT1 and the code memory 306. The code memory 306 has memory areas divided in units of 32 kilobytes and, in consideration of enabling a simultaneous control of writing (at the time of reading) and reading (at the time of printing), each memory area stores a code data for each page.

The management table MT1 has recorded therein the number and the page number indicative of one of the areas of the code memory 306, the number of the areas connected together, and various value-added information such as, for example, a compression system and a data length, necessary for the compression and expansion processing so that the code memory 306 can be dynamically managed on the basis of these information.

The central processing unit 106 formulates information of the management table MT1 when the image data is read from the image memory 304 and is then compressed, and controls the compressor 311 to cause the information to be stored in the code memory 306. When the image data are outputted, the code data is read from the code memory 306 in a manner substantially reverse to the operation described above. The information in the management table MT1 is erased when all necessary number of information associated with such page is normally discharged.

The operating mode of the storage unit 30 includes a direct-coupled mode, a memory mode including a memory mode write operation and a memory mode read operation, and a mixed mode in which the direct-coupled mode and the memory mode take place simultaneously.

During the direct-coupled mode, the image data D2 outputted from the image signal processing unit 20 are outputted directly to the print processing unit 40 as an image data D3. In other words, during the direct-coupled mode, the bus gates 322, 324 and 325 of the selector 301 are switched on to connect a bus of the image signal processing unit 20 directly with a bus of the print processing unit 40 so that the image data D2 and the color data DC can be outputted directly as the image data D3 and the color data DC.

During the memory mode, subsequent to the image data D2 having been digitized, the digitized data is read in the image memory 304 to apply a required process thereto and, when the necessity occurs, the processed data is read out from the image memory 304 to output the image data D3 to the print processing unit 40. In other words, during the memory mode, the bus gates 321 and 324 are switched on at the time of the memory mode read operation (from a reading device to a memory) to output both of the image data D2 and the color data DC to the digitizer 302 and are, after having been digitized, written in the image memory 304 and then compressed before it is written in the code memory 306.

Also, during the memory mode read operation (from a memory to a printer), the bus gates 323 and 325 are switched on to allow the expanded image data to be read from the image memory 304, thereby outputting the image data D3 and the color data DC therefrom.

During the mixed mode, the bus gates 321, 322, 324 and 325 are switched on and the image data D2 and the color data DC are outputted directly to the print processing unit 40 as the image data D3 and the color data DC and, simultaneously therewith, the image data D2 and the color data DC are written in the image memory 304 through the digitizer 302.

The operating mode of the storage unit 30 is automatically selected depending on the copy mode. By way of example, during a normal copy mode, the direct-coupled mode is selected; and during a multi-copy mode from a single-sided document, the mixed mode is selected for the first copy and the memory mode read operation is selected for the subsequent copies. Accordingly, it is possible to accomplish a replacement of the document during the printing operation thereby improving the system throughput.

During a multi-copy mode from a double-sided document, the memory mode write operation is carried out at the time of reading of the second side of the document, and the document is subsequently reversed upside down. The direct-coupled mode takes place when the first side of the document is to be read, while a printing of the second side of the document is carried out during the memory mode read operation. In this way, it is possible to accomplish the reversion of the document one time.

Also, as will be described in detail later, during a mode in which a duplex copy is formed for each of a plurality of double-sided documents, the memory mode and the direct-coupled mode are switched over with each other when an appropriate number of copies have been made, and during the memory mode, the memory mode write operation and the memory mode read operation parallel to each other at an appropriate time.

As hereinabove described, depending on the copy mode the operating mode of the storage unit 30 is selected and, during the same copy mode the operating mode is switched or the two operations parallel to each other, thereby increasing the copying speed and the convenience to handle the copying machine.

During any one of the memory mode and the mixed mode, the image data D2 are digitized, compressed and stored in the code memory 306. Accordingly, with a minimized memory capacity a large amount of image data can be stored. However, it is to be noted that without being compressed and without being digitized, the image data can be stored in an appropriate memory in the form as presented.

FIG. 9 illustrates a block circuit diagram of the print processing unit 40. As shown therein, the print processing unit 4° 0 comprises a color separating selector 401 for selecting, on the basis of the color data DC, one of output destinations to which the image data D3 is to be outputted, two buffers 411 and 412, a delay memory 421, and LD drivers 431 and 432 for driving respective semiconductor lasers 61 and 62.

Where the image data D3 inputted from the storage unit 30 corresponds to the second color (red), the image data D3 is supplied from the color separating selector 401 to the LD driver 431 through the buffer 411 so as to control the drive of the semiconductor laser 61. On the other hand, where the image data D3 corresponds to the first color (black), due to a delay resulting from a difference in exposure position on the photoreceptor drum 71 as discussed hereinbefore, the image data D3 is supplied to the LD driver 432 through the buffer 411 and then through the delay memory 421 so as to control the drive of the semiconductor laser 62.

Hereinafter, the sequence of entire operation of the copying machine 1 under each of the various modes will be discussed. In describing the sequence referred to above, reference is mainly directed to the flow of a query command (Q), a report (A) and a data all transacted among the various central processing units 101 to 106. It is to be noted in some of the drawings to which reference is made in the following description, the command or report which is not important is omitted occasionally.

Figure 10:
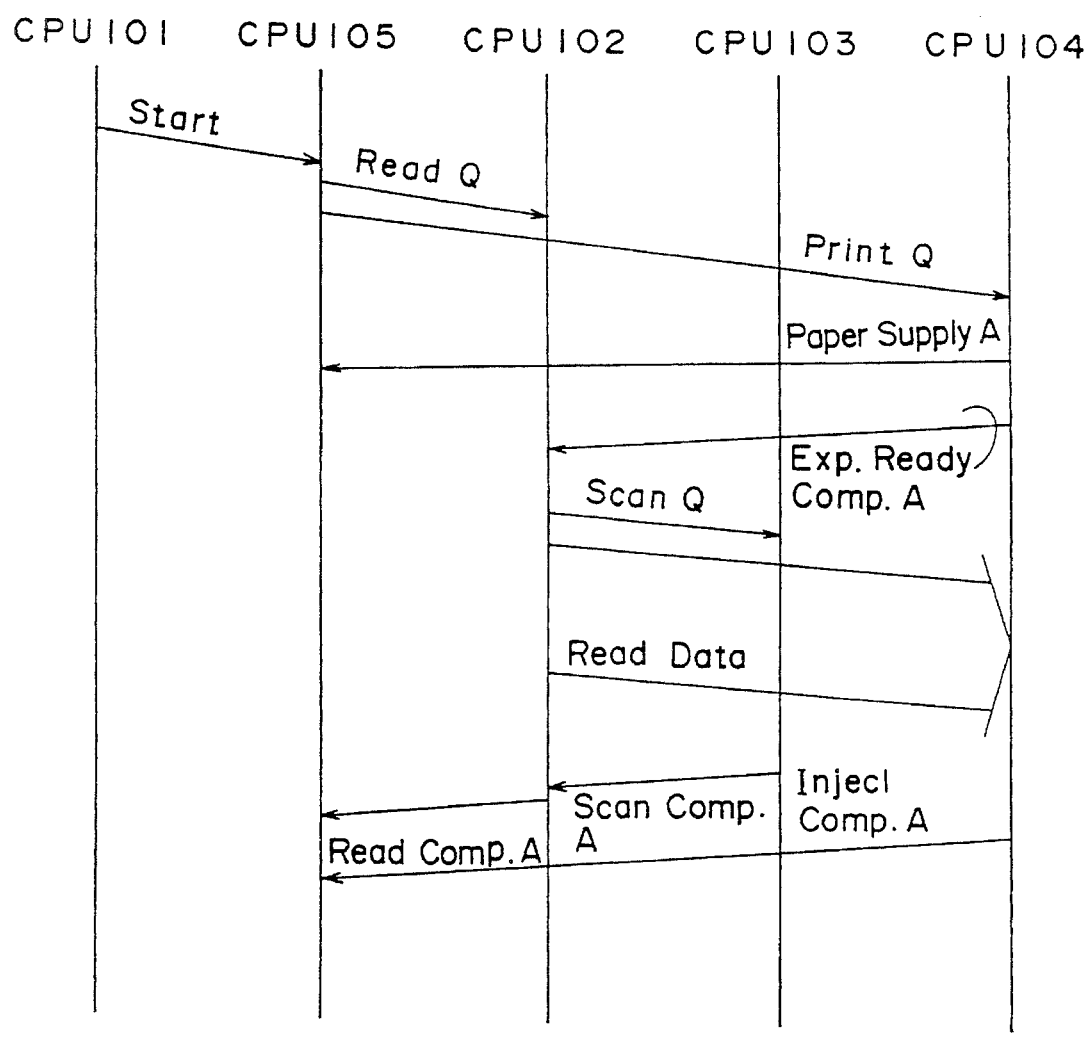
FIG. 10 is a diagram showing the sequence of operation during a direct-coupled mode.

FIG. 10 is a diagram showing the sequence of operation during the direct-coupled mode. As hereinabove described, during the direct-coupled mode, based on the image data supplied from the image reader IR, a simultaneous printing is performed by the printer PRT.

When the start key 96 is depressed, a start query is issued from the central processing unit 101 to the central processing unit 105 and, in response thereto, a read query and a print query are issued from the central processing unit 105 to the central processing unit 102 and from the central processing unit 105 to the central processing unit 104, respectively, while a paper supply report indicative of the status of paper supply is issued from the central processing unit 104 to the central processing unit 105.

Since the operation of the image reader IR is synchronized with that of the printer PRT, the timing of actual reading by the scanner 19 occurs after a signal indicative of a completion of an exposure ready condition which means that in the image forming system 70 the recording paper has been supplied to a predetermined position in readiness for the printing has been issued from the central processing unit 104 to the central processing unit 102. When this signal indicative of the completion of the exposure ready condition is issued, the scanning is initiated thereby and, when it arrives at an image area of the document, a read data (image data) is outputted to the printer PRT to effect the actual printing on the recording paper according to the image processing mode (for example, a magnification, a γ correction, an image quality correction and so on) set by the central processing unit 102.

Upon completion of the reading by the scanning, a scan completion report is issued from the central processing unit 103 to the central processing unit 102, a read completion report is issued from the central processing unit 102 to the central processing unit 105, and an inject completion report is issued from the central processing unit 104 to the central processing unit 105.

Figure 11:
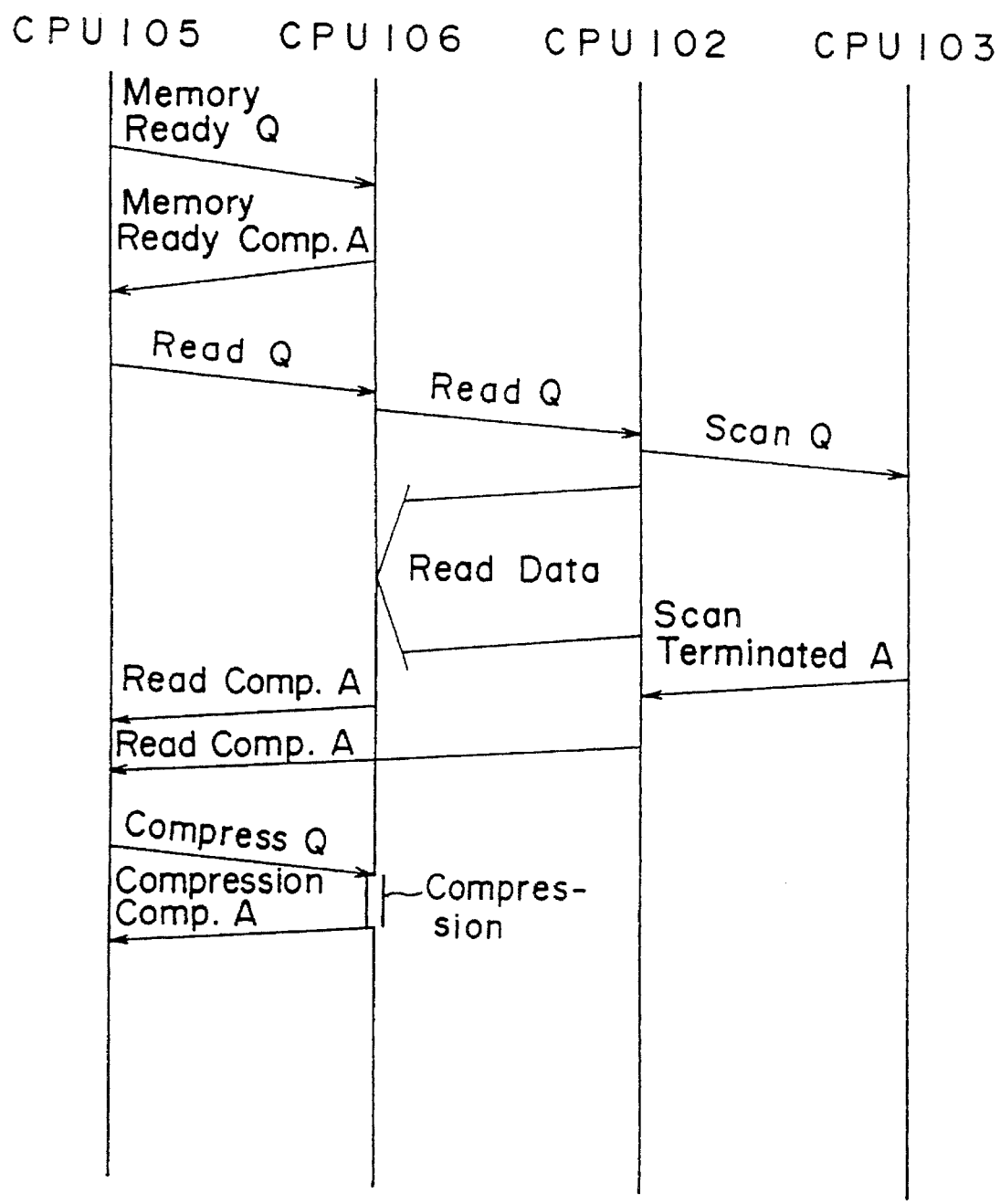
FIG. 11 is a diagram showing the sequence of operation during a memory mode write operation.

FIG. 11 is a diagram showing the sequence of operation under the memory mode write operation. As hereinbefore described, during the memory mode write operation, the image data is transferred from the image reader IR to the image memory 304.

As shown in FIG. 11, in the first place, a memory ready query is issued from the central processing unit 105, which manages the entire sequence, to the central processing unit 106. In response thereto, the central processing unit 106 acts on the various internal hardwares to set the status of connection of the selector 301 for transferring the image data D2 from the image signal processing unit 20 to the image memory 304, to set the mode for the digitalization (for example, an error dispersion method, a threshold value for erasure of the skin, a threshold value for the digitalization and so on) and to set XY length information and a start address for writing into the image memory 304.

When the preparation is completed subsequent to those settings, a memory ready completion report is issued from the central processing unit 106 to the central processing unit 105. In response thereto, a read query is issued from the central processing unit 105 to the central processing units 106 and 102 and, also, a scan query is issued from the central processing unit 102 to the central processing unit 103, thereby initiating the scanning.

When it arrives at an image area of the document as a result of the scanning, the read data (image data D2) is outputted to the storage unit 30 according to the image processing mode set by the central processing unit 102. Upon completion of the reading by scanning, a read completion report is issued from the central processing units 106 and 102 to the central processing unit 105. Thereafter, a compression query is issued from the central processing unit 105 to the central processing unit 106 and, in response thereto, the central processing unit 106 sets and drives an read address from the image memory 304, the XY length information, a write address to the code memory 306 and the mode of the compressor 311 (for example, MH scheme). In this way, the compression process takes place and a code data is stored in the code memory 306.

Upon completion of the compression process, a compression completion report is issued from the central processing unit 106 to the central processing unit 105.

Figure 12:
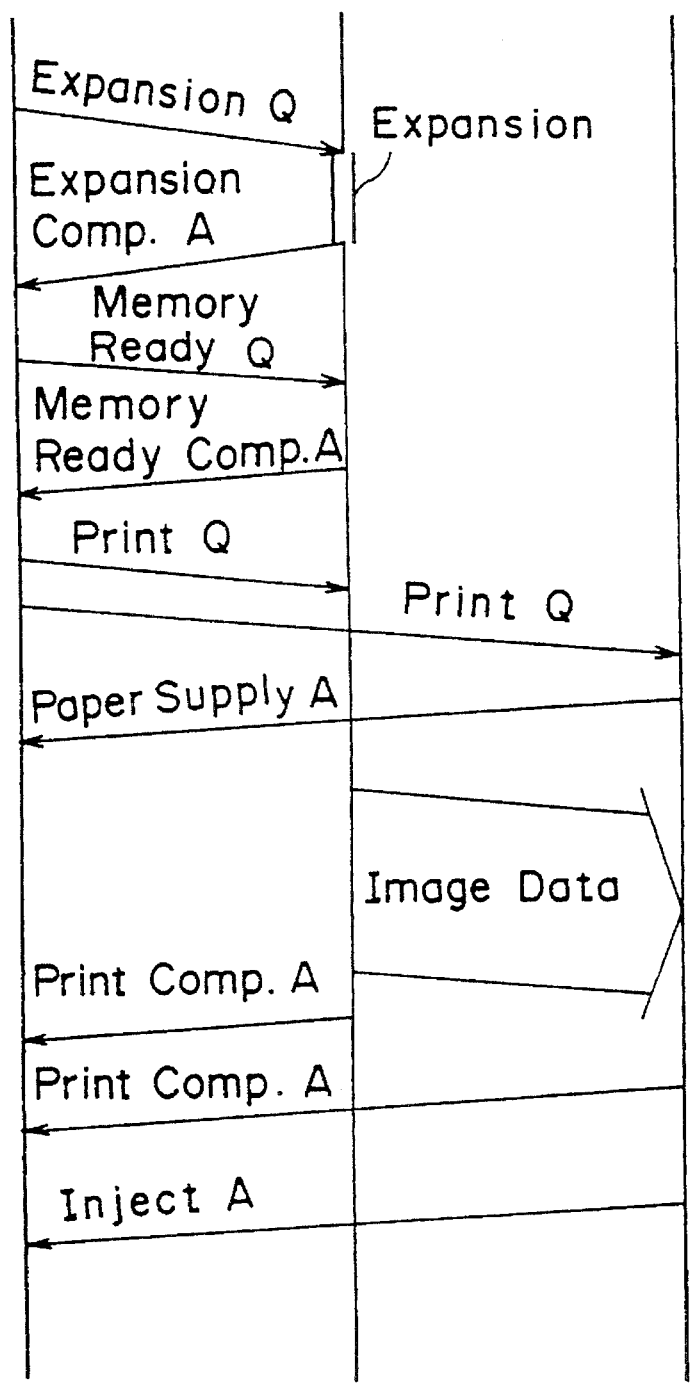
FIG. 12 is a diagram showing the sequence of operation during a memory mode read operation.

FIG. 12 is a diagram showing the sequence of operation of the memory mode read operation. As hereinbefore described, during the memory mode read operation, the image data is read from the image memory 304 and is outputted to the printer PRT to initiate the actual printing on the recording paper.

As shown in FIG. 12, the memory mode read operation starts with an issue of an extension query from the central processing unit 105 to the central processing unit 106. In response thereto, the central processing unit 106 sets and drives a read address from the code memory 306, the amount of data, a write address to be written in the image data 304, the XY length information and the mode (for example, MH scheme) of the extender 312. In this way, the expansion process takes place and the image data is written in the image memory 304.

Upon completion of the expansion, an expansion completion report is issued from the central processing unit 106 to the central processing unit 105. Thereafter, a memory ready query necessary for the image data to be read from the image memory 304 is issued from the central processing unit 105 to the central processing unit 106. In response thereto, the central processing unit 106 performs to the various internal hardwares various settings such as the setting of the status of connection of the selector 301 for outputting the image data D3 from the image memory 304 to the print processing unit 40, the setting for the rotation process and the setting of a start address for the reading from the image memory 304 and the XY length information.

When the preparation completes subsequent to those settings, a memory ready completion report is issued from the central processing unit 106 to the central processing unit 105. In response thereto, a print query is issued from the central processing unit 105 to the central processing units 106 and 104, and a paper supply report indicative of the status of supply of the recording paper is issued from the central processing unit 104 to the central processing unit 105. Then, the image data D3 read out from the image memory 304 is outputted to the printer PRT to initiate the actual printing.

Upon completion of the printing, a print completion report and an inject completion report are issued from the central processing units 106 and 104 to the central processing unit 105. In response thereto, the central processing unit 105 issues a memory clear query to the central processing unit 106 in view of its association with an operating mode.

Figure 13:
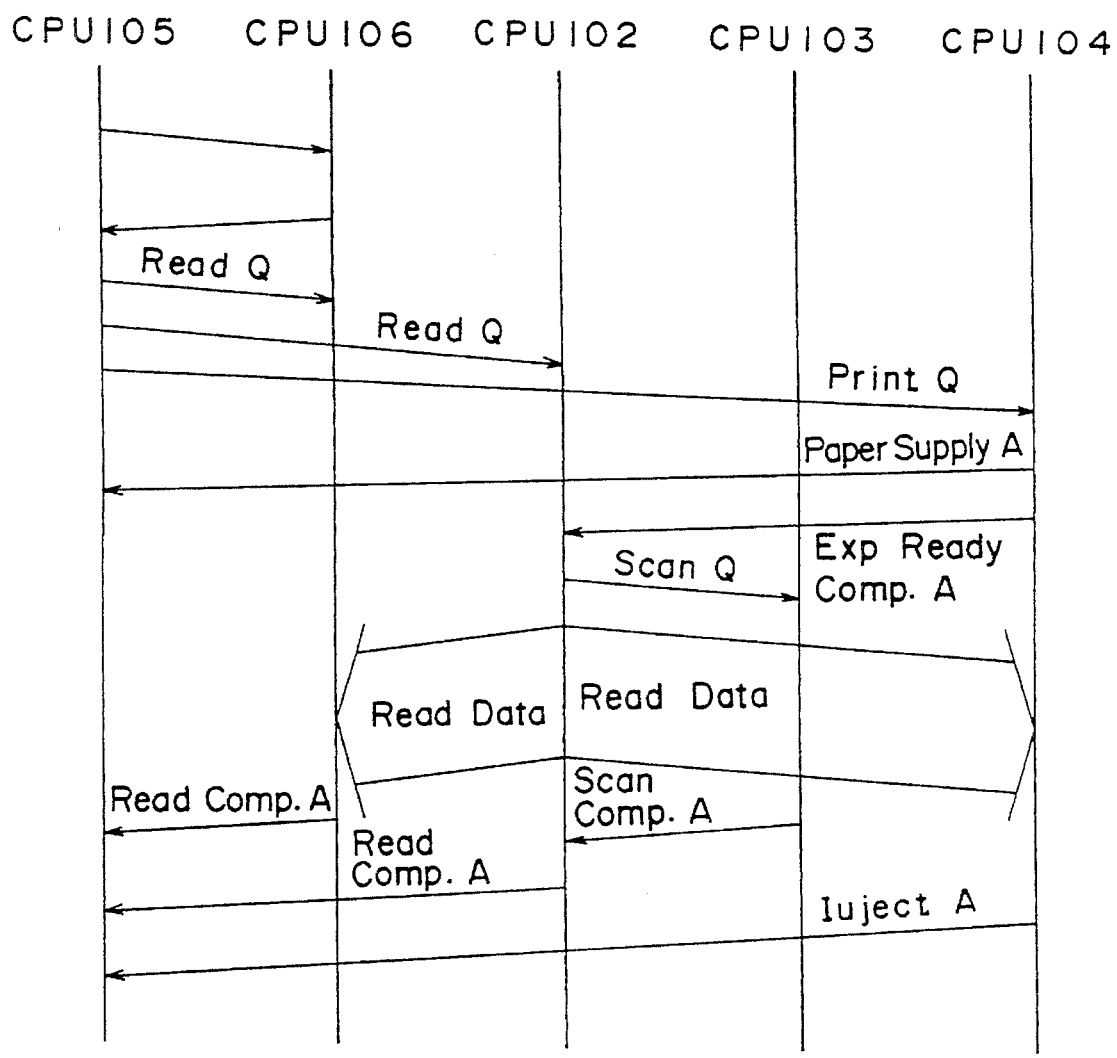
FIG. 13 is a diagram showing the sequence of operation during a direct-coupled mode.

FIG. 13 is a diagram showing the sequence of operation during the mixed mode. During the mixed mode, the image data D2 is outputted from the image reader IR to the printer PRT and, at the same time, the image data D2 are outputted from the image reader IR to the printer PRT to accomplish the printing while causing the data to be stored in the image memory 304.

As shown in FIG. 13, a memory ready query is issued from the central processing unit 105 to the central processing unit 106. In response thereto, the central processing unit 106 performs various settings to the various internal hardwares. After the preparation subsequent to those settings, a memory ready completion report is issued from the central processing unit 106 to the central processing unit 105. In response thereto, a read query and a print query are issued from the central processing unit 105 to the central processing units 106 and 102 and from the central processing unit 105 to the central processing unit 104, respectively.

When a paper supply report or an exposure ready completion is issued from the central processing unit 104 to the central processing units 105 and 102, a scan query is issued from the central processing unit 102 to the central processing unit 103. As a result thereof, the scanning is initiated with the read data (image data) consequently outputted to the printer PRT to initiate the actual printing and, at the same time, the read data is digitized and then stored in the image memory 304.

Upon completion of the reading by scanning, a read completion report is issued from the central processing units 106 and 102 to the central processing unit 105 and, also, a scan completion report is issued from the central processing unit 103 to the central processing unit 102.

Figure 14:
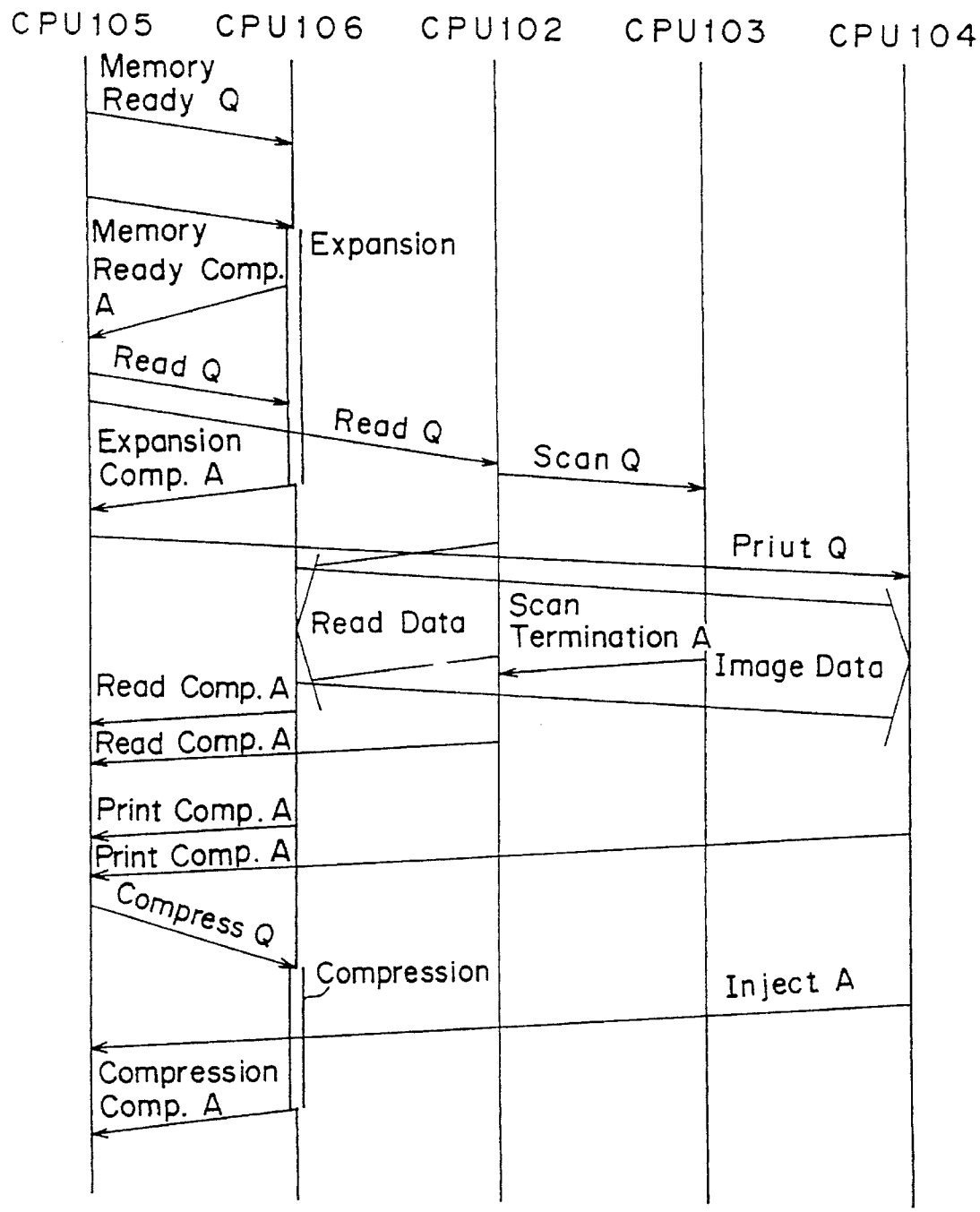
FIG. 14 is a diagram showing the sequence of operation which takes place when the memory mode write operation and the memory mode read operation parallel with each other.
Figure 15:
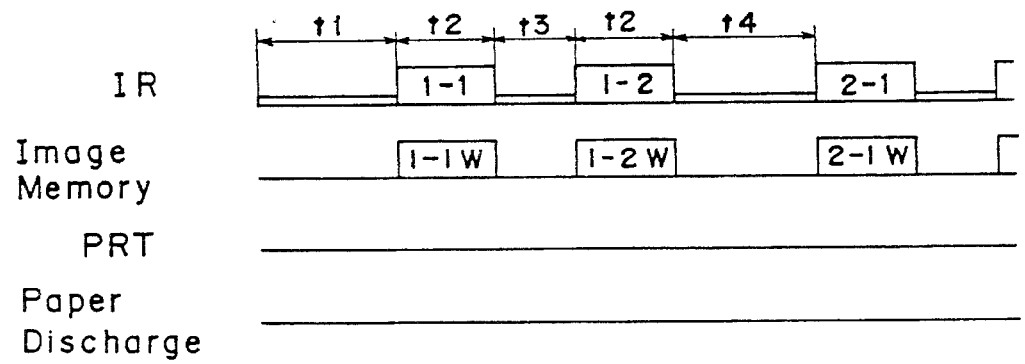
FIGS. 15 to 20 are timing charts showing the sequence of a copying operation performed by the copying machine.
Figure 16:
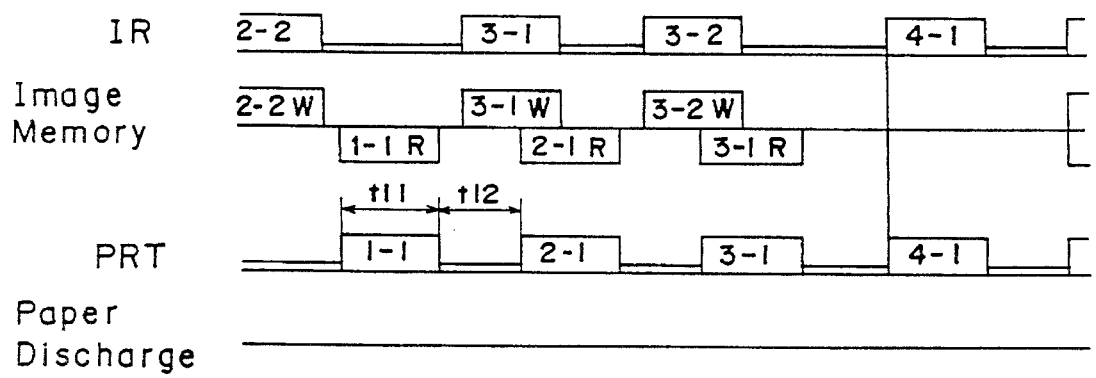
Figure 17:
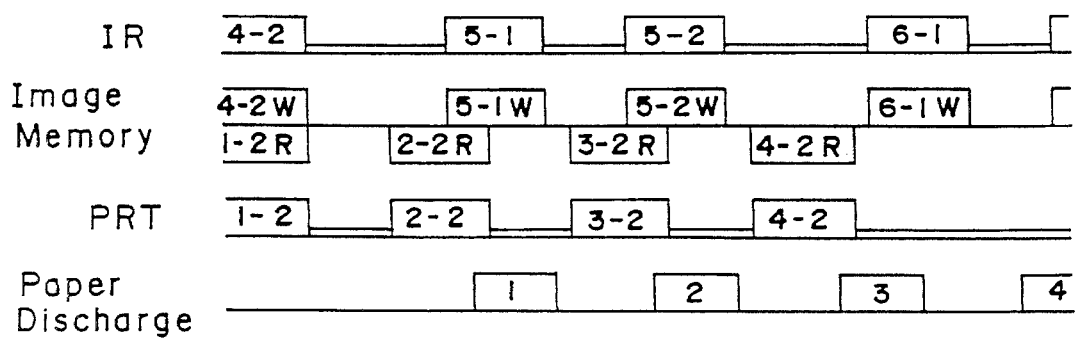
Figure 18:
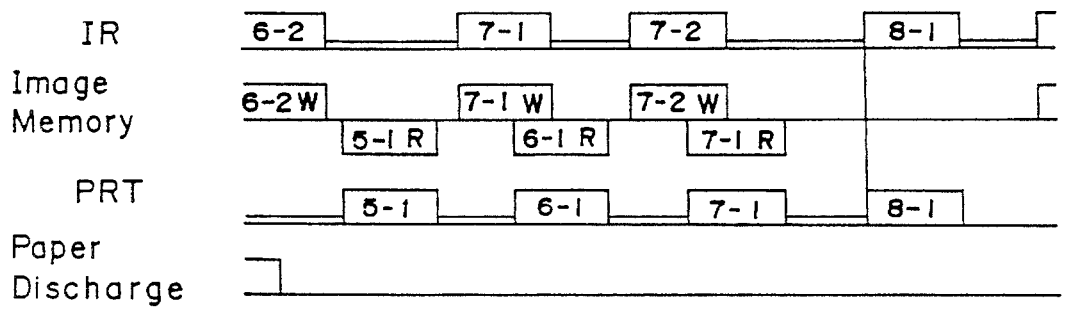
Figure 19:
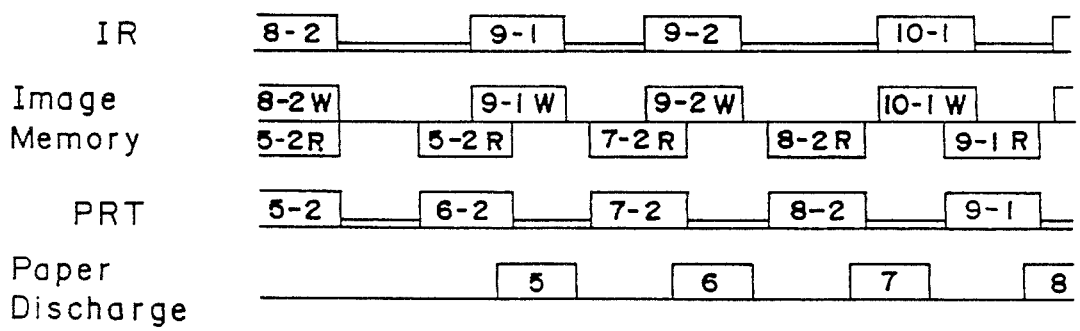
Figure 20:
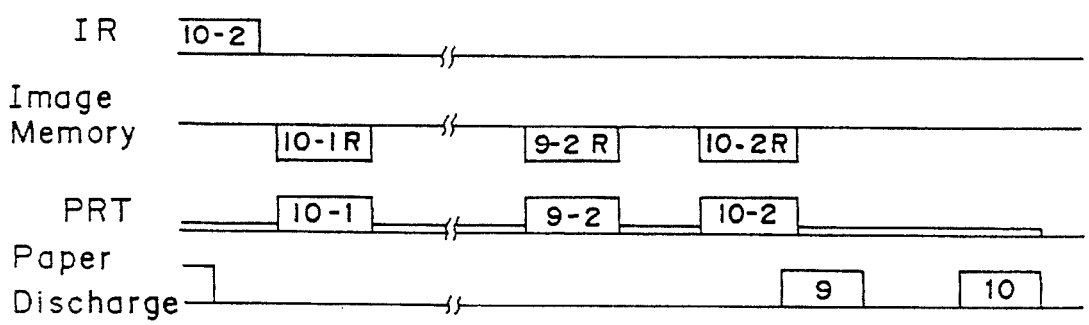

FIG. 14 is a diagram showing the sequence of operation which takes place when the memory mode write operation and the memory mode read operation take place simultaneously. During this sequence of operation shown in FIG. 14, the previously described memory mode write operation and the previously described memory mode read operation take place simultaneously and in parallel relation to each other and take place on such occasions as indicated by 4-2W and 1-2R shown in FIG. 17 as will be referred to later. It is, however, to be noted that the contents of this sequence of operation are similar to those discussed with reference to FIGS. 11 and 12 and, therefore, the details will not be reiterated for the sake of brevity.

In the meantime, a paper jamming may often occur during the execution of the copying cycle. A countermeasure (a jam removal process) to be taken when the next succeeding jamming occurs will now be described. The jam removal process includes a jam removal A mode and a jam removal B mode depending on the operating mode of the storage unit 30.

During the execution under the direct-coupled mode (FIG. 10), and in the event that a paper jamming occurs during the outputting of the read data, the occurrence of the jamming is indicated from the central processing unit 104 to the central processing unit 105 and a stop query is issued from the central processing unit 104 to the central processing unit 102. Also, a stop query or a read completion report is issued from the central processing unit 102 to the central processing units 103 and 105, respectively.

The occurrence of the paper jamming is indicated from the central processing unit 105 to the central processing unit 101 and is, at the same time, indicated on the operating panel OP so that the operator can come to be aware of the occurrence of the paper jamming. The operator should then open a front cover of the copying machine to perform an appropriate procedure, followed by a depression of a reset key SW11 to ascertain a completion of the procedure. Thereafter, the start key 96 is again depressed to resume the copying cycle. This is the jam removal B mode.

In the event that the paper jamming occurs during the reading of the image data from the image memory 30 while the memory mode read operation (FIG. 12) is taking place, a jam occurrence is indicated from the central processing unit 104 to the central processing unit 105, causing the central processing unit 105 to issue a stop query to the central processing unit 106.

Also, when the front cover once opened by the operator has been closed subsequent to the performance of the appropriate procedure that had been necessitated in view of the display of the jam occurrence on the operating panel OP, the closure of the front cover is detected by the cover sensor SE13 (FIG. 1), causing the central processing; unit 104 to issue a ready signal to the central processing; unit 105. In response thereto, the central processing unit 105 issues an expansion query shown in FIG. 12 thereby to automatically resume the memory mode read operation. This is the jam removal A mode.

In other words, under the jam removal A mode, in the event of an occurrence of the paper jamming during the execution of the memory mode read operation, the memory mode read operation is resumed with no need for the operator to depress the start key 96 subsequent to the removal of the paper jamming, thereby facilitating a quick restoration subsequent to the jam removal. Thus, the copying machine as a whole is very convenient to handle.

By way of example, the case in which 10 double-sided documents are desired to be individually copied to give a double-sided copy for each such document will now be described with reference to FIGS. 15 to 20 showing the sequence of copying cycles performed by the copying machine 1. In reviewing these figures, it is to be noted that, of the characters depicted in each block shown in these figures, digits "1" and "2" represent the first and second opposite sides of each document, respectively; a character "W" represents the write operation for writing into the image memory 304; a character "R" represents a read operation for reading from the image memory 304; and a numeral used in connection with the paper discharge represents the number of the recording paper which matches with the number of the associated document. Also, a double line shown in these figures in connection with the image reader IR represents a document transport operation performed by the document transport unit 500, a double line shown in connection with the printer PRT represents a paper transport operation performed internally in the printer PRT, and a single line represents a wait condition. It is also to be noted that, in these figures, neither the data compressing process and the data expanding process are not shown and those operation take place after the writing operation or before the reading operation.

When the copying operation is started, the first one of the documents is transported (the time required to do this being shown by t1) and the first side of the first document is read and is then stored in the image memory 304 by the memory mode write operation (the time required to do this being shown by t2). Thereafter, the first document is transported (the time required to do this being shown by t3) and the second side of the first document is subsequently read and stored in the image memory 304 (the time required to do this being shown by t2).

The discharge of the first document is followed by a transport of the next succeeding, i.e., second, document (the time required to do this being shown by t4) and the first side of the second document is read and stored in the image memory 304 in a manner similar to that with the first document.

During a transport of the third document, an image data associated with the first side of the first document is read from the image memory 304 by the memory mode read operation and is subsequently printed on the first side of the first recording paper (the time required to do this being shown by t11).

Thereafter, the second recording paper is transported (the time required to do this being shown by t12), and the image data associated with the first side of the second document is read from the image memory 304 and is subsequently printed on the first side of the second recording paper in a similar manner. At this time, the memory mode read operation is carried out with respect to the first side of the third, a portion of which takes place in parallel relationship. Also, the reading of the second side of the fourth (the memory mode write operation) and the printing on the second side of the first (the memory mode read operation), and the reading of the second side of the eighth and the printing of the second side of the fourth are carried out in their entirety in parallel relationship with each other.

In these timing charts, although most of the operations are carried out under the memory mode, the operating mode is switched over to the direct-coupled mode when the fourth and eighth documents are to be read, that is, when every fourth document is to be read, so that the printing onto the recording paper takes place simultaneously with the reading of the document. The reason that a time is required before the printing is carried out relative to the first side of each of the first and fourth documents is because of a synchronization of the timing at which the above described direct-coupled mode.

The above described write and read operations in relation to the image memory are sequentially executed according to a task formulated for each page. Under the direct-coupled mode, since the image reader IR and the printer PRT operates at the same timing, no task is formulated.

It is to be noted that an actual measurement of each required time applies where the document is of an A4-size and t1, t2, t3, t4, t11 and t12 were 2.05, 1.27, 1.25, 2.15, 1.27 and 1.26 seconds, respectively. Thus, the total length of time required to give the 10 double-sided copies based on the 10 double-sided documents was about 75 seconds.

On the other hand, where the prior art double-side copying is performed simultaneously with the printing by sequentially transporting and reversing the documents in the order from the first side of the first, the second side of the first, the first side of the second, the second side of the second, and so on, while the recording papers are successively supplied, 135 seconds, which is about twice the time required in the present invention, has been required to make the 10 double-sided copies.

Also, where the image reader IR and the printer PRT have respective throughputs of, for example, 30 sheets per minute and 35 sheets per minute, respectively, making double-sided copies of double-sided documents would bring about a reduction in performance of the prior art copying machine to several sheets per minute. However, the copying machine 1 embodying the present invention can give a performance which is substantially twice that of the prior art copying machine.

As discussed above, with the copying machine 1 embodying the present invention, the image reader IR and the printer PRT can operate independently from each other. At the same time, since the writing (at the time of reading of the document) and the reading (at the time of printing) in relation to the storage unit 30 are performed using independent and dedicated circuit blocks while the code memory 306 is dynamically managed with the use of the management table MT1, the reading of the document and the printing on the recording paper can operate in parallel relation with each other. Again, since the operating mode can be switched during the execution under the same copy mode, the copying speed is increased accompanied by an improvement in productivity.

Hereinafter, the sequence of operation of the copying machine 1 will be described with reference to the flowcharts shown in FIGS. 21 to 43. The following description starts with the main routines executed by the central processing units 101 to 108, followed by subroutines performed during the execution of the associated main routines.

Referring first to FIG. 21, there is shown the main routine executed by the central processing unit 101. Subsequent to initialization at step #11, an internal timer is started to monitor so that the length of time for the routine becomes constant (steps #12 and #16). Thereafter input control processes and display control processes are carried out in relation to the operating panel OP and others at successive steps #13 and #14, followed by execution of other processings at step #15. It is to be noted that, by means of an interruption process communication is carried out with other central processing units 102 to 108.

FIG. 22 illustrates the main routine executed by the central processing unit 102. Subsequent to an input processing of the image data at step #23, a positioning process is performed at step #24 to adjust a time difference resulting from a displacement in position between the photoelectric elements 16 and 17. Thereafter, a color discrimination, an image processing, an output processing of the image data, and other processings are sequentially carried out at respective steps #25 to #28.

Figure 23:
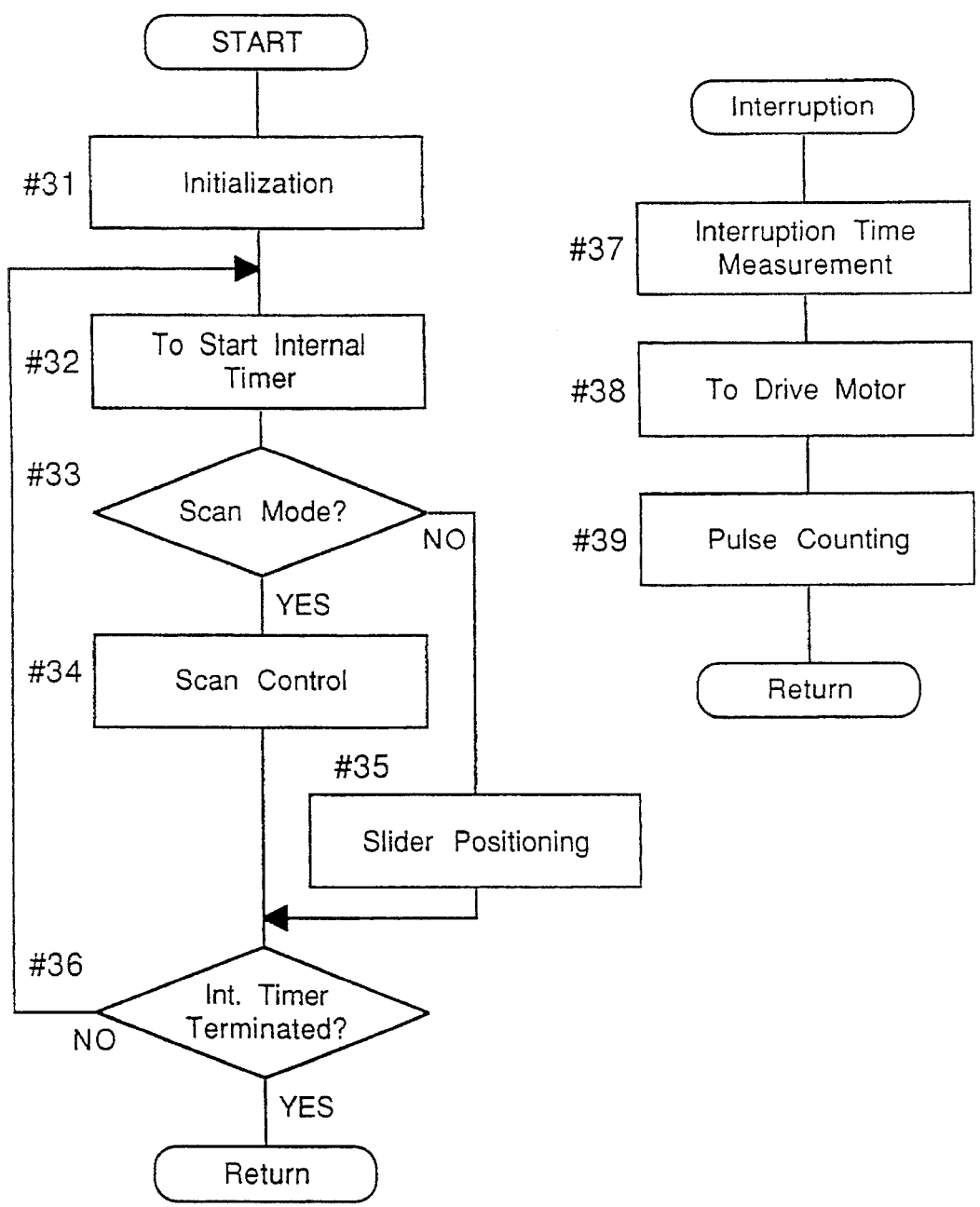
FIG. 23 is a flowchart showing a main routine executed by a central processing unit 103.

FIG. 23 illustrates the main routine executed by the central processing unit 103. The central processing unit 103 controls the scanning system 10. If the mode is a scan mode as indicated by "YES" at step #33, a scan control for scanning the scanner 19 is carried out at step #34, but if the mode is a panning mode as indicated by "NO" at step #33, a slider positioning control is executed at step #35.

On the other hand, in the event that a motor pulse interruption is initiated by a motor pulse generated in synchronism with rotation of the scan motor M2, the length of time interval during which the interruption by the motor pulse occurs is measured at step #37, followed by a switching on and off of the supply of an electric power to the motor at step #38 whereafter the number of the motor pulses is counted at step #39.

Figure 24:
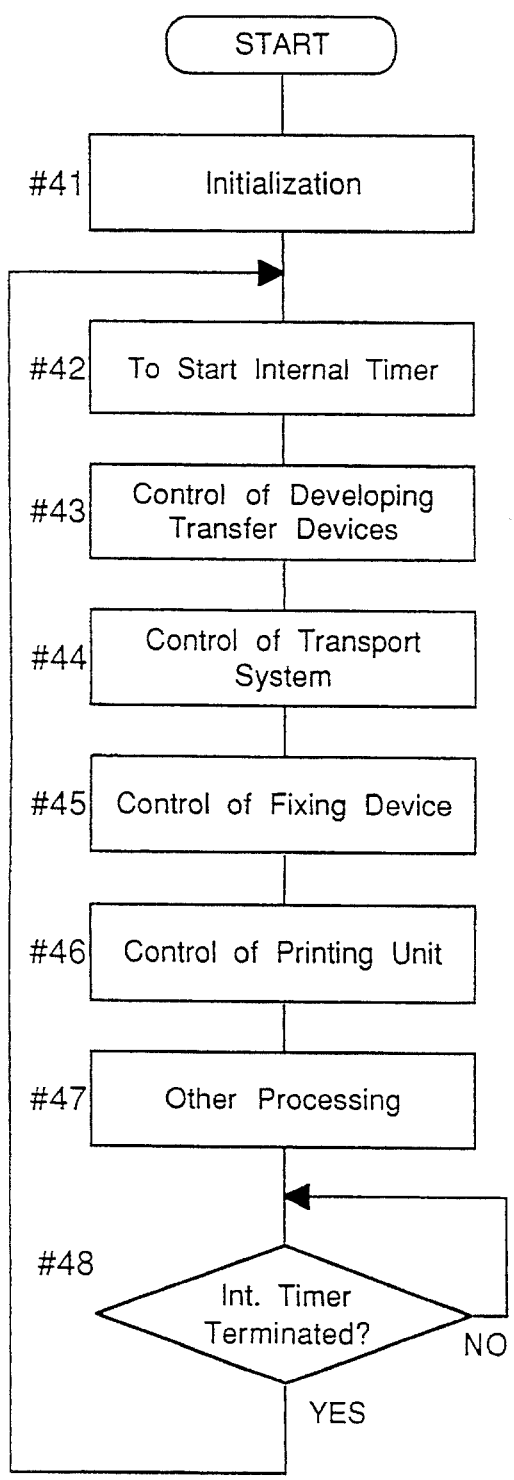
FIG. 24 is a flowchart showing a main routine executed by a central processing unit 104.

FIG. 24 illustrates the main routine executed by the central processing unit 104. As hereinbefore discussed, the central processing unit 104 controls the printer PRT. This main routine comprises a control of the developing and transfer system 70A at step #43, a control of the transport system 70B at step #44, a control of the fixing system 70C at step #45, a control of the print processing unit 40 at step #46 and other processings at step #47.

During the control at step #44, subsequent to the detection of the paper size by means of the size detecting sensors SE11 and SE12, the central processing unit 104 calculates the paper supply path length, the paper interval, and the paper size and, based on a result of this calculation, a stack available number M to the paper supply path is determined. It is, however, to be noted that, since the paper supply path length and the paper interval are fixed, the number of paper supply paths is determined in reference to the detected paper size.

Figure 25:
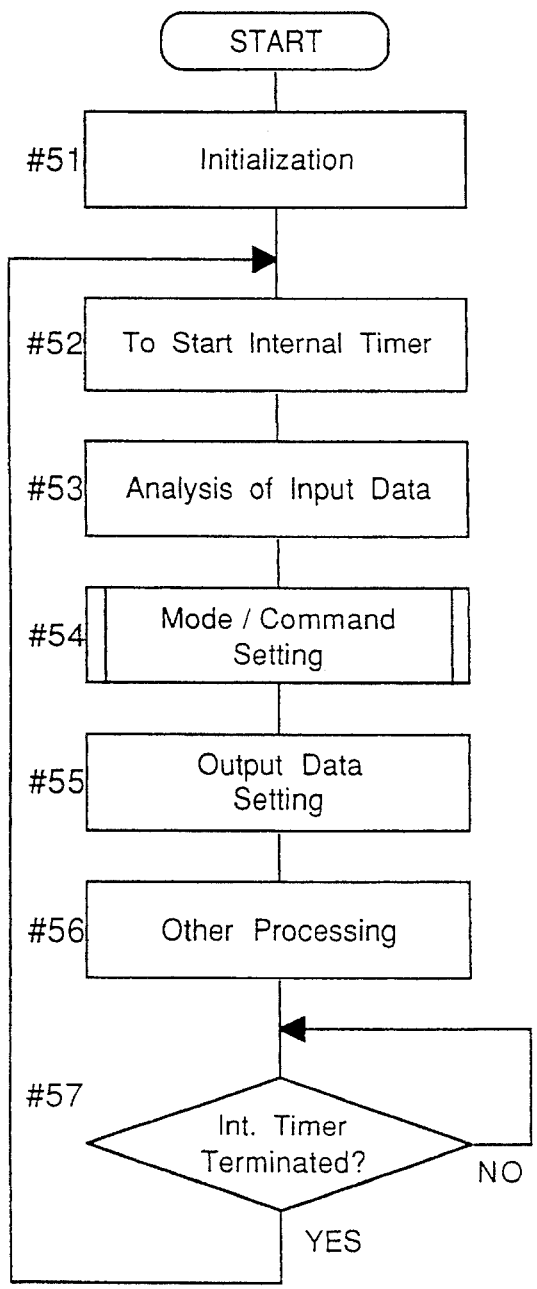
FIG. 25 is a flowchart showing a main routine executed by a central processing unit 105.

FIG. 25 illustrates the main routine executed by the central processing unit 105. This central processing unit 105 acts on the other central processing unit or units to set a drive command, a stop command and an operating mode thereby to control the entire system operation of the copying machine 1. Subsequent to a check of the data inputted through communication by an interruption, contents are analyzed at step #53 and, depending on the analyzed contents, a mode/command setting process for newly setting a drive command or a mode data of magnification such as whether or not there is an element to be subsequently operated or whether or not the magnification is changed is executed at step #54. Thereafter, at step #55, the data thereof is set in an output area so that it can be outputted through communication.

Figure 26:
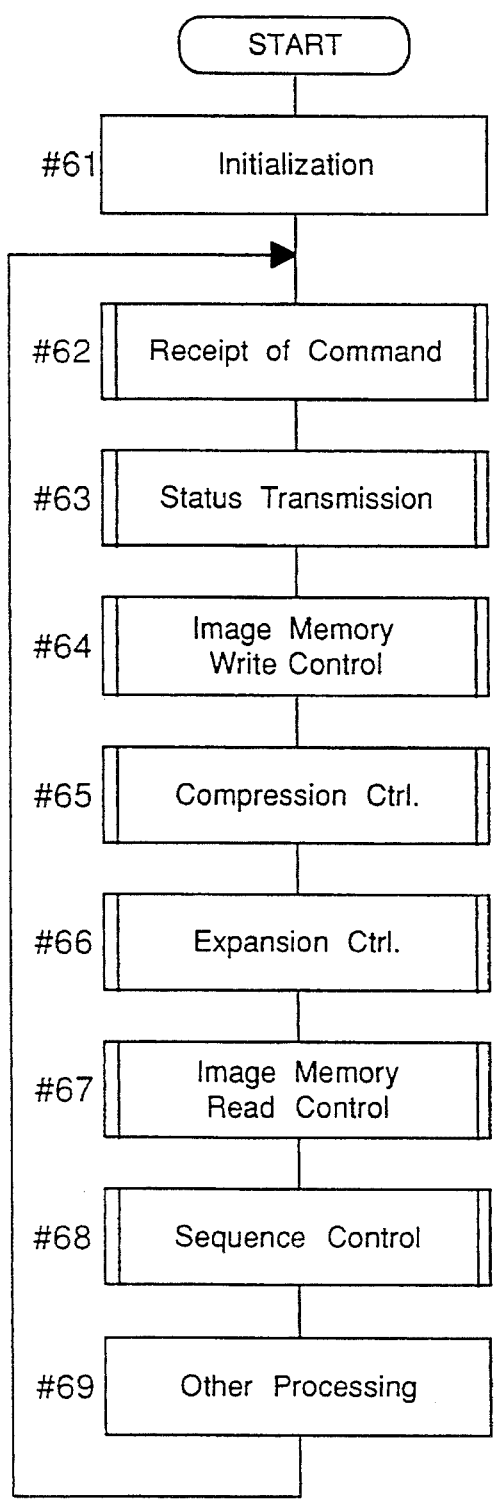
FIG. 26 is a flowchart showing a main routine executed by a central processing unit 106.

FIG. 26 illustrates the main routine executed by the central processing unit 106. The central processing unit 106 is used to control the storage unit 30. This main routine comprises a command receiving process for receiving commands from the other central processing units that is carried out at step #62, a status transmission process at step #63, a write control for controlling the writing into the image memory 304 at step #64, a compression step at step #65, an expansion control at step #66, a read control for controlling the reading from the image memory 304, and a sequence control at step #68.

Figure 27:
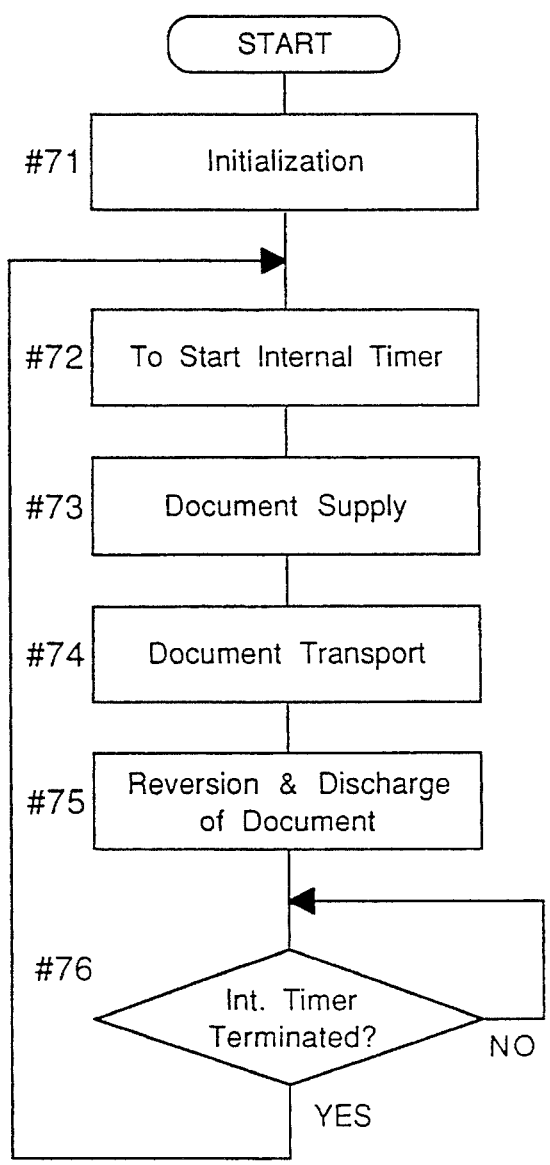
FIG. 27 is a flowchart showing a main routine executed by a central processing unit 107.

FIG. 27 illustrates the main routine executed by the central processing unit 107 which is used to control the document transport unit 500. This main routine comprises a document supply process at step #73 for rectifying a slant-wise travel of the document by shuffling the documents and for controlling a transport of the document to the transport belt 506, a document transport process at step #74 for positioning the document at a predetermined reading position by means of the transport belt 506 and also for controlling a transport of the document to the invert0r roller 507, and a document inversion and discharge process at step #75 for discharging the document which has arrived at the invertor roller 507 or for retransporting it to the transport belt 506.

Figure 28:
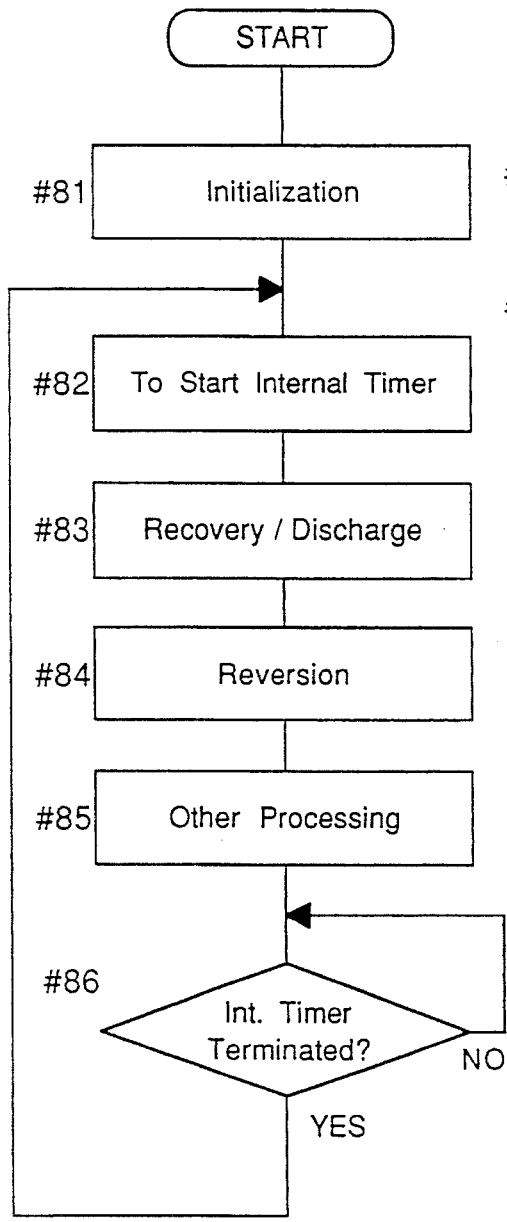
FIG. 28 is a flowchart showing a main routine executed by a central processing unit 108.

FIG. 28 illustrates the main routine executed by the central processing unit 108 which is used to control the paper recirculating unit 600. At step #83, a recovery/discharge process for temporarily accommodating the printed recording paper discharged from the image forming system 70 or discharging it onto the recovery tray 621 so that the printing can be effected on the second side of the recording paper is performed. Then at subsequent step #84, a reversion process is carried out for reversing the accommodated paper upside down.

It is to be noted that, during the recovery/discharge process, whether or not the recording paper is discharged from the image forming system 70 is detected by the discharge sensor SE62 disposed adjacent a discharge mouth through which the recording paper is discharged. During the discharge the transport roller 602 is driven, but upon completion of the discharge the transport roller 602 is brought to a halt after a predetermined time. Also, during the reversion, the invertor roller 603 is driven in one direction so long as the reverse sensor SE61 is in process of detecting the recording paper, but when the reverse sensor SE61 is switched off, the invertor roller 603 is driven in the opposite direction and is subsequently brought to a halt after a predetermined time.

Figure 29:
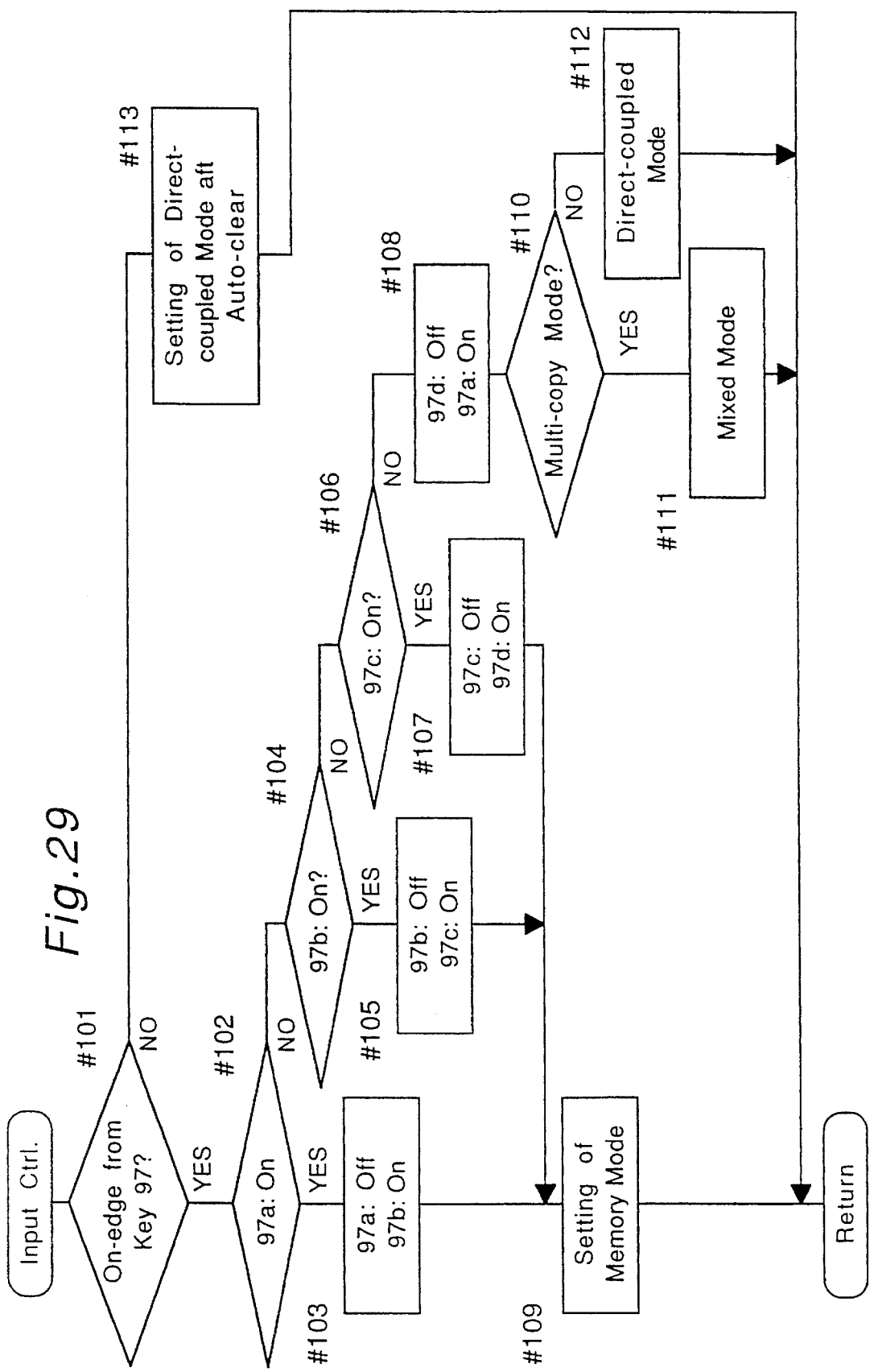
FIG. 29 is a flowchart showing an input control process.

FIG. 29 illustrates a flowchart of the input control process executed at step #13 of the main routine of FIG. 21. Each time an on-edge of the mode selector key 97 as indicated by "YES" at step #101, "Single-Single", "Double-Single", "Single-Double" and "Double-Double" copy modes are switched one after another in a circulating fashion, followed by sequential lighting of the mode indicators 97a to 97d at respective steps #102 to #108.

In the event that the copy mode other than the "Single-Single" copy mode is selected at each step #103, #105 and #107, the memory mode is selected at step #109. On the other hand, in the event that the "Single-Single" copy mode is selected at step #108, and if the multi-copy mode has been selected as indicated by "YES" at step #110, the mixed mode is selected at step #111, but in the case of the single copy mode as indicated by "NO" at step #110, the direct-coupled mode is selected at step #112.

Should no on-edge of the mode selector key 97 be detected as indicated by "NO" at step #101, the direct-coupled mode is selected at step #113 after an automatic clearing.

Figure 30:
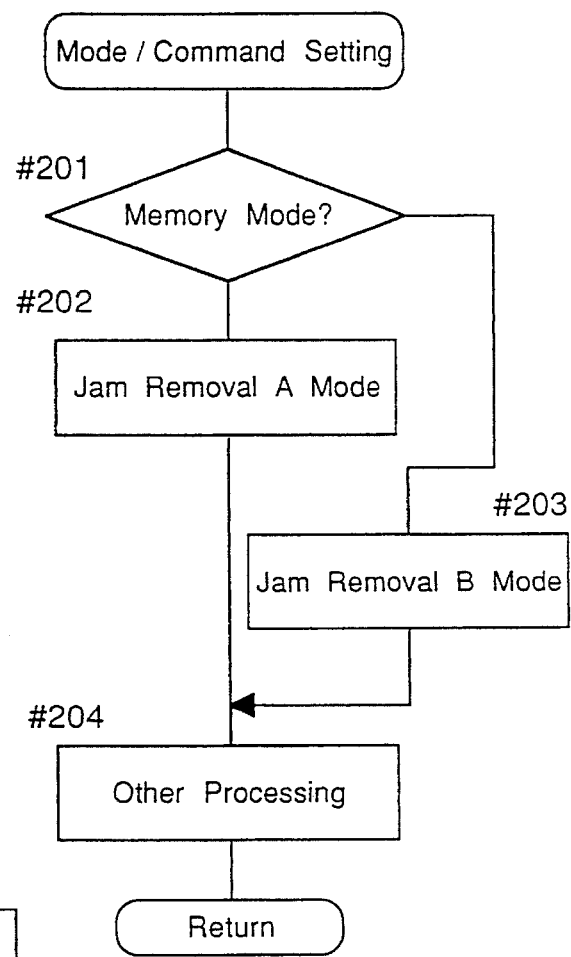
FIG. 30 is a flowchart showing a mode/command setting process.

FIG. 30 illustrates a flowchart for the mode/command setting process executed at step #54.

Under the memory mode as indicated by "YES" at step #201, the selective opening and closure of the front cover is detected by the cover sensor SE13 when the paper jamming occurs, and, after the jam removal, the jam removal A mode in which the memory mode is resumed is automatically resumed at step #202. On the other hand, if it is not under the memory mode as indicated by "NO" at step #201, the jam removal B mode is resumed at step #203 when the operator depresses the reset key SW11 subsequent to the jam removal.

Figure 31:
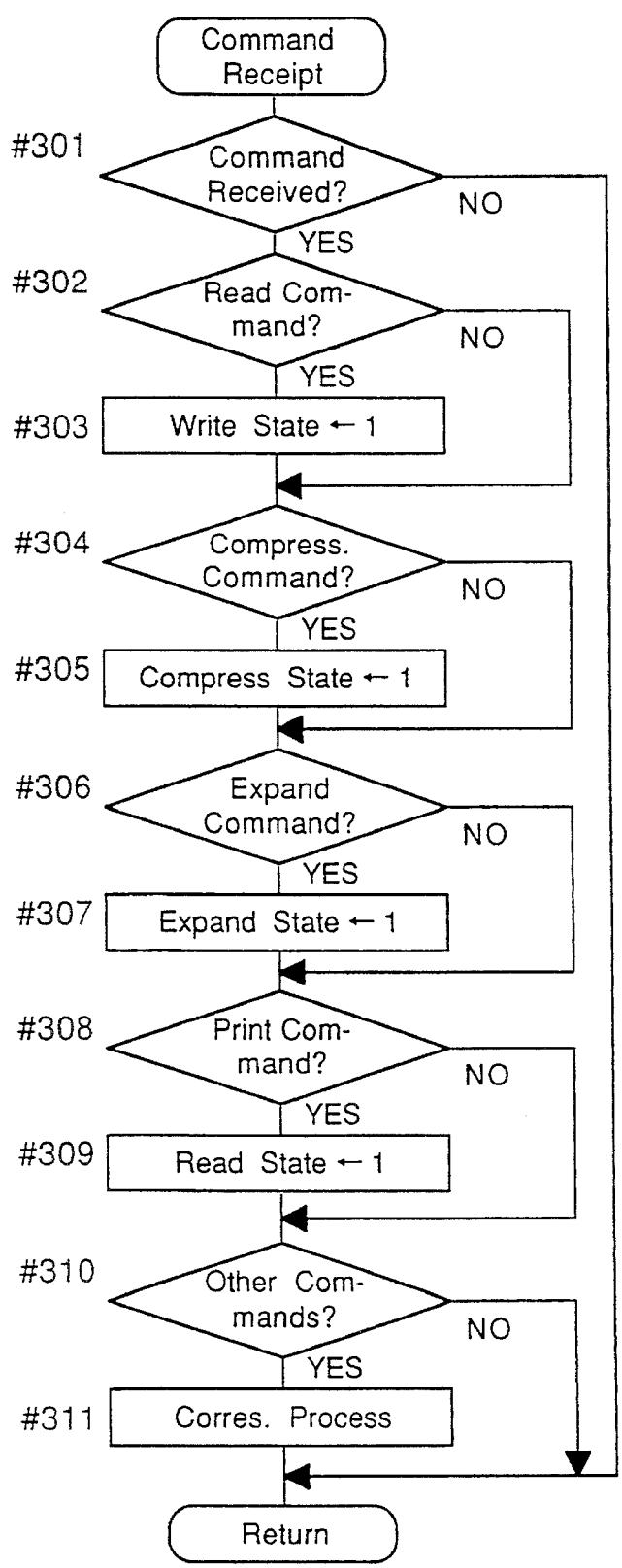
FIG. 31 is a flowchart showing a command receiving process.

FIG. 31 illustrates a flowchart for the command receiving process executed at step #62 of the main routine of FIG. 26.

When a command is received as indicated by "YES" at step #301, and if the command is a read command as determined at step #302, the write state of the image memory 304 is rendered to be "1" at step #303; if the command is a compression command as determined at step #304, the compression state is rendered to be "1" at step #305; if the command is an expansion command as determined at step #306, the expansion state is rendered to be "1" at step #307; and if the command is a print command as determined at step #308, the write state is rendered to be "1" at step #309.

Figure 32:
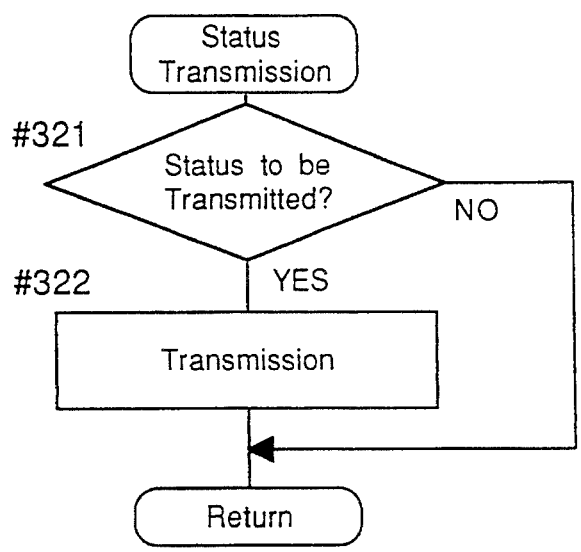
FIG. 32 is a flowchart showing a status transmission process.
Figure 33:
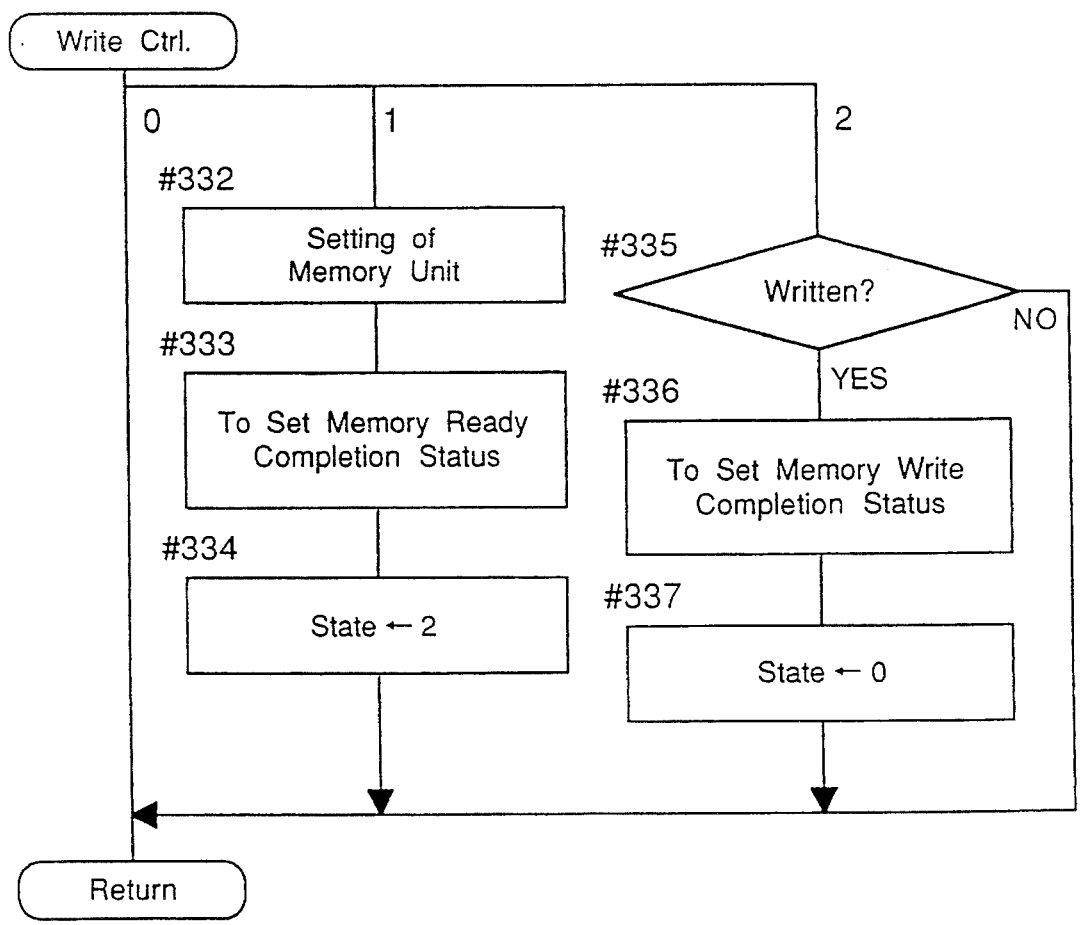
FIG. 33 is a flowchart showing an image memory write control process.

FIG. 32 illustrates a flowchart for a status transmission process executed at step #63 of FIG. 26. In the presence of a transmission status as determined at step #321, it is transmitted at step #322.

FIG. 32 shows a flowchart for the image memory write control process executed at step #64 of FIG. 26. As shown therein, at state "1", the write start address for writing in the image memory 304, the XY length information, the image processing parameter and others are set at step #332, a memory ready completion status is set at step #333, and the state is rendered to be "2" at step #334.

At state "2", when the writing in the image memory 304 completes as indicated by "YES" at step #335, a read completion status is set at step #336 and the state is rendered to be "0" at step #337.

Figure 34:
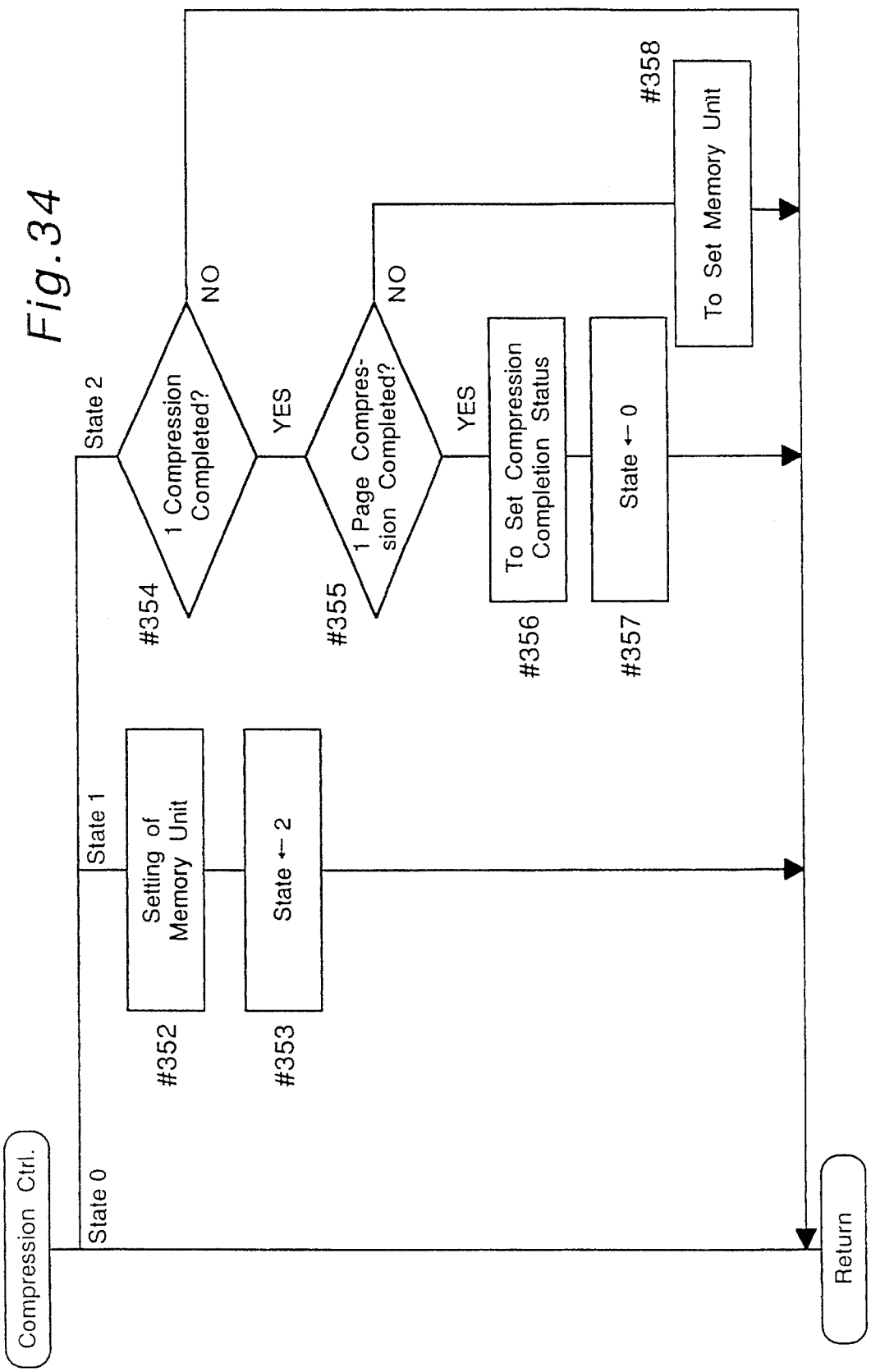
FIG. 34 is a flowchart showing a compression control process.

FIG. 34 illustrates a flowchart for the compression control process executed at step #65 of FIG. 26. As shown therein, at state "1", various settings for the compression such as the read address for reading from the image memory 304, the XY length information, the write address for writing in the code memory 306 and the compression scheme are performed and, for this purpose, the contents of the management table MT1 are changed at step #352 and the state is rendered to be "2" at step #353.

At state "2", the setting is performed at step #358 each time the compression process for each memory area of 32 kilobytes is completed, and the compression completion status is set at step #356 each time the compression process for each page is completed, followed by the state being rendered to be "0" at step #357.

Figure 35:
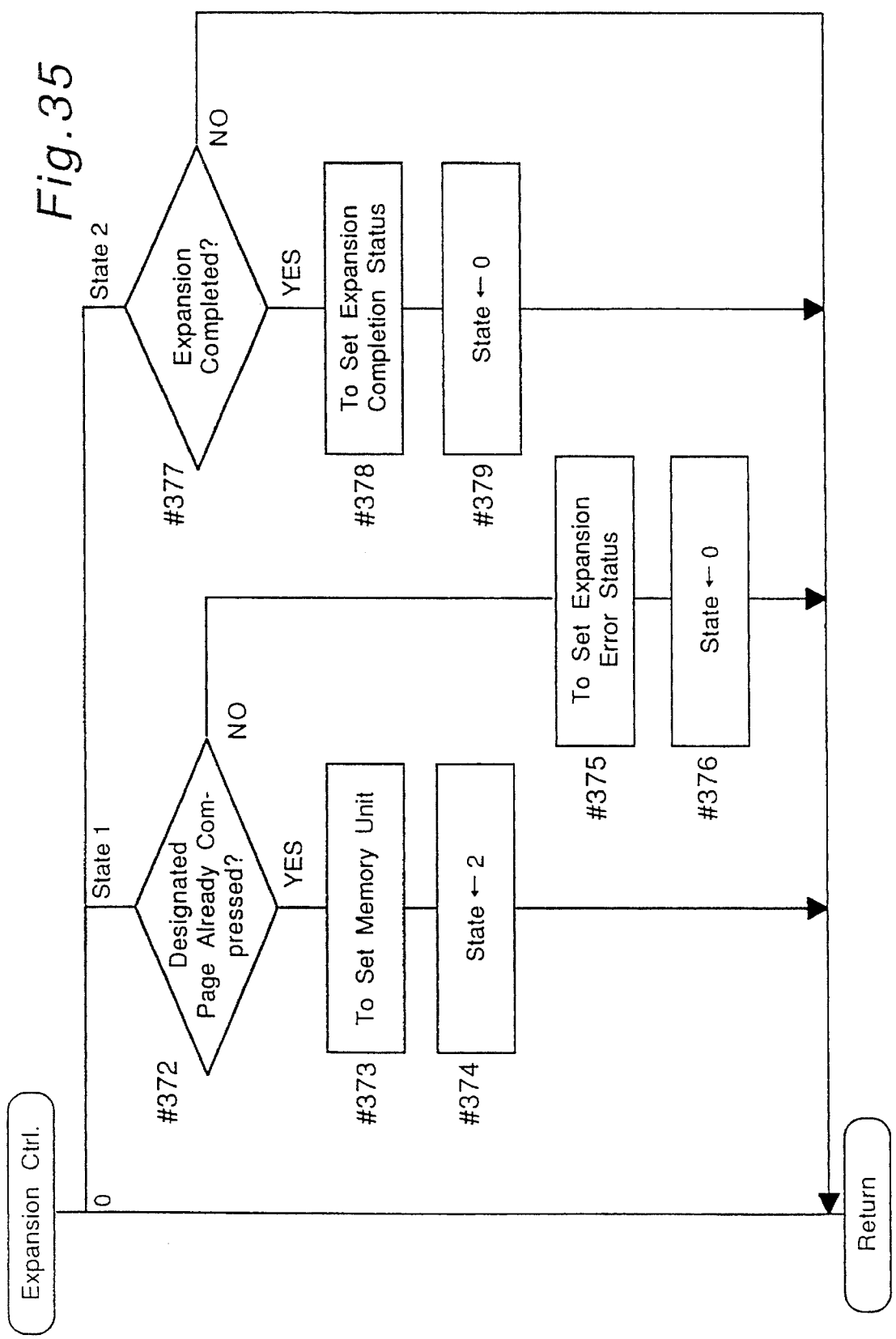
FIG. 35 is a flowchart showing an expansion control process.

FIG. 35 illustrates the flowchart for the expansion control process executed at step #66 of FIG. 26. At state "1", a decision is made at step #372 to determine if the specified page has been compressed and, if it is indicated "YES" at step #372, the setting of the storage unit 30 is carried out at step #373 and the state is rendered to be "2" at step #374. On the other hand, if the result of decision at step #372 indicates "NO", the expansion error status is set at step #375 and the state is rendered to be "0" at step #376.

At state "2", the expansion completion status is set at step #378 when it has been confirmed that the expansion process completed at step #377, and the state is then rendered to be "0" at step #379.

Figure 36:
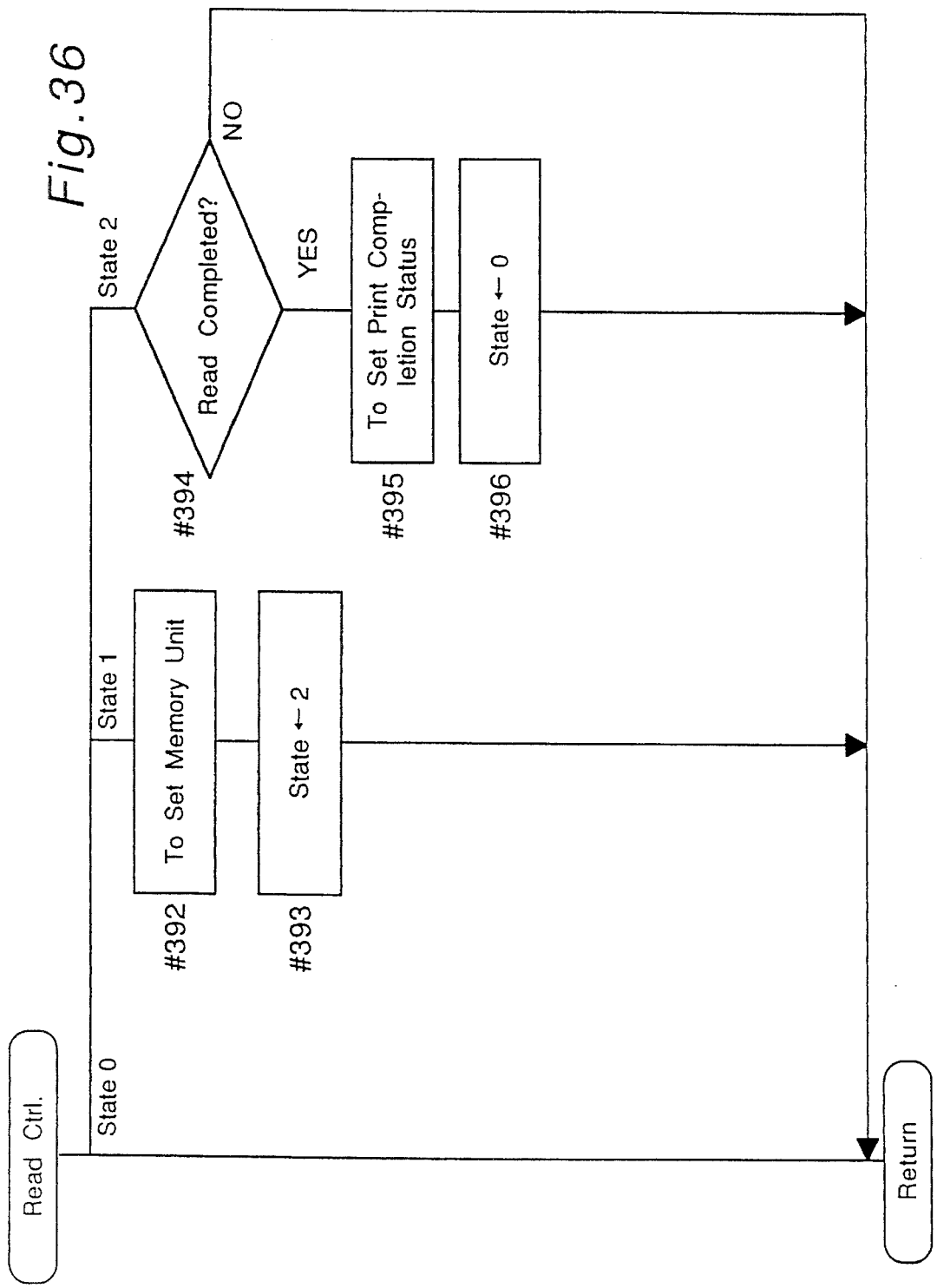
FIG. 36 is a flowchart showing an image memory read control process.

FIG. 36 illustrates a flowchart for the image memory read control process executed at step #67 of FIG. 26. As shown therein, at state "1", the read start address for reading to the image memory 304, the amount of data and other parameters are set at step #392 and the state is then rendered to be "2" at step #393. At state "2", when the reading from the image memory 304 completes as indicated by "YES" at step #394, the print completion status is set at step #395 and the state is then rendered to be "0" at step #396.

Figure 37:
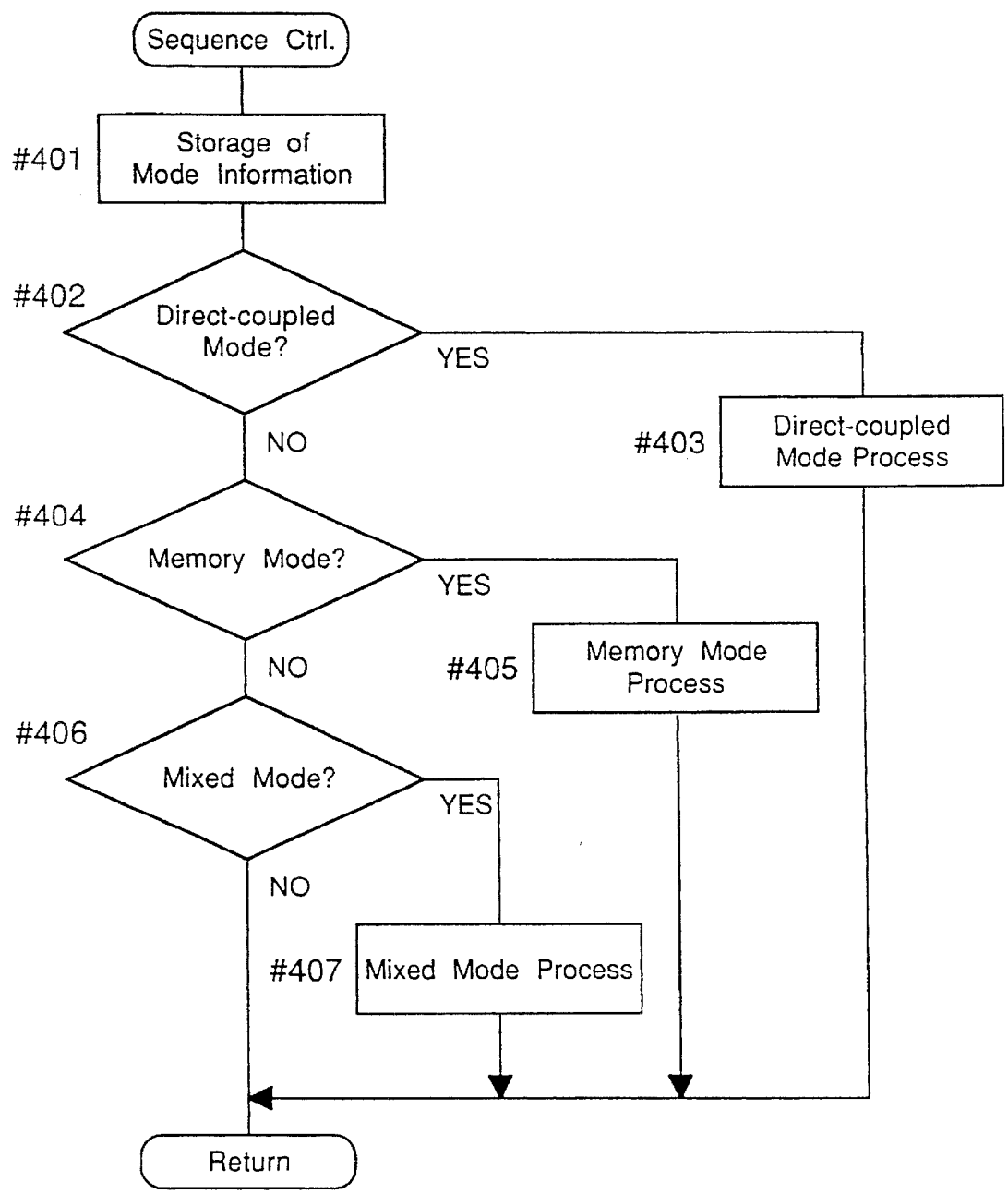
FIG. 37 is a flowchart showing a sequence control process.

FIG. 37 is a flowchart for the sequence control process executed at step #68 of FIG. 26. Statuses of settings made through the operating panel OP such as information concerning the operating mode of the storage unit 30, for example, the copy mode, the paper size, the number of copies to be made and so on are stored at step #401. Then at step #403, the contents thereof are judged and, if under the direct-coupled mode, the direct-coupled mode process is executed at step #403. On the other hand, if under the memory mode as determined at step #404, the memory mode process is carried out at step #405. On the other hand, if under the mixed mode as determined at step #406, the mixed mode process is carried out at step #407.

Figure 38:
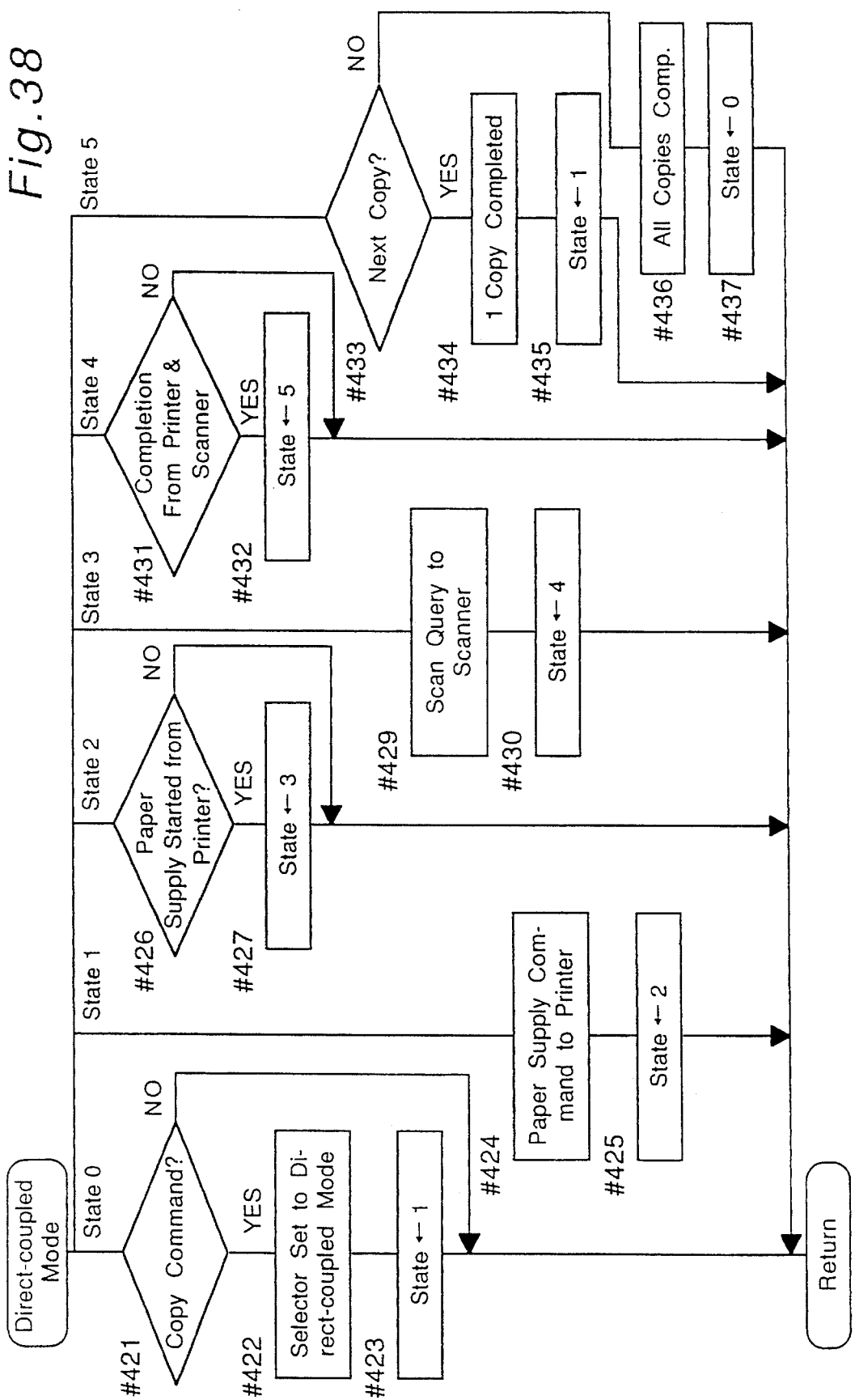
FIG. 38 is a flowchart showing a direct-coupled mode process.

FIG. 38 illustrates a flowchart for the direct-coupled mode process executed at step #403 of FIG. 37. As shown therein, at state "0", if the copy command exists as indicated by "YES" at step #421, the various control signals SG1 to SG5 are selectively set to active or inactive states at step #422 so that the state of connection of the selector 301 represents the direct-coupled mode (See FIG. 7(b)). Thereafter, the state is rendered to be "1" at step #423.

At state "1", a paper supply command is issued to the printer PRT at step #424 and the state is then rendered to be "2" at step #425.

At state "2", when the paper supply signal is outputted from the printer PRT at step #424, the state is rendered to be "2" at step #427.

At state "3", the scan query is issued to the scanner at step #429 and the state is then rendered to be "4" at step #430.

At state "4", in the event that each of the printer PRT and the scanner issue the termination signal at step #431, the state is rendered to be "52 at step #432.

At state "5", if there is the next succeeding copy as determined at step #433, one copy is deemed having been made at step #434 and the state is then rendered to be "1" at step #435. If there is no next succeeding copy as determined at step #433, the whole number of copies is deemed having been made at step #436 and the state is then rendered to be "0" at step #437.

Figure 39:
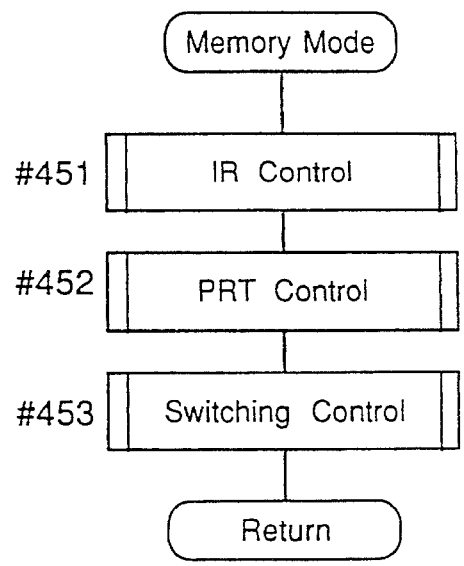
FIG. 39 is a flowchart showing a memory mode process.

FIG. 39 illustrates a flowchart for the memory mode process executed at step #405 of FIG. 37. Referring now to FIG. 39, the IR control for controlling the image reader IR is carried out at step #451 and the PRT control for controlling the printer PRT is then carried out at step #453, followed by a switching control at step #453.

Figure 40:
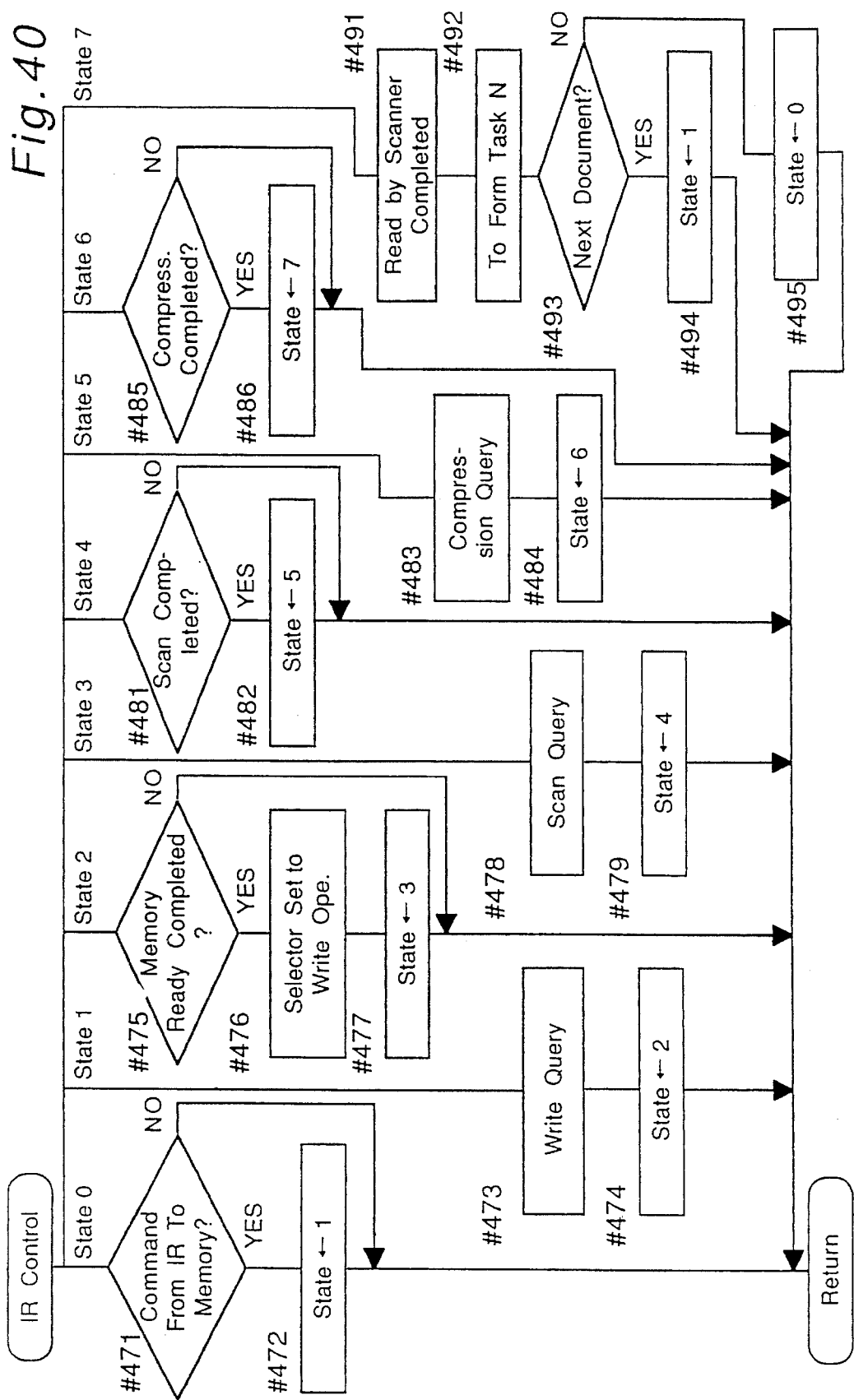
FIG. 40 is a flowchart showing an IR control process.

Referring to FIG. 40 showing a flowchart for the IR control executed at step #451 of FIG. 39, at state "0", if there is a command issued from the central processing unit 105 of the image reader IR to the image memory 304 as determined at step #471, the state is rendered to be "1" at step #472.

At state "1", the write query is issued to the image memory 304 at step #473 and the state is then rendered to be "2" at step #474.

At state "2", if the memory ready completion is established as indicated by "YES" at step #475, the setting is performed at step #476 so that the state of connection of the selector 301 represents the memory mode write operation, and the state is then rendered to be "3" at step #477.

At state "3", the scan query is issued to the scanner at step #478 and the state is rendered to be "4" at step #479.

At state "4", when the scan terminated signal is outputted from the scanner as determined at step #481, the state is rendered to be "5" at step #482.

At state "5", the compression query is issued at step #483 and the state is then rendered to be "6" at step #484.

At state "6", if the compression is completed as determined at step #485, the state is rendered to be "7" at step #486.

At state "7", the reading by the scanner is deemed as terminated at step #491 and the task N is formulated at step #492. Then, if there is the next succeeding document as determined at step #493, the state is rendered to be "1" at step #494, but if there is no next succeeding document as determined at sep "493, the state is rendered to be "0" at step #495.

Figure 41:
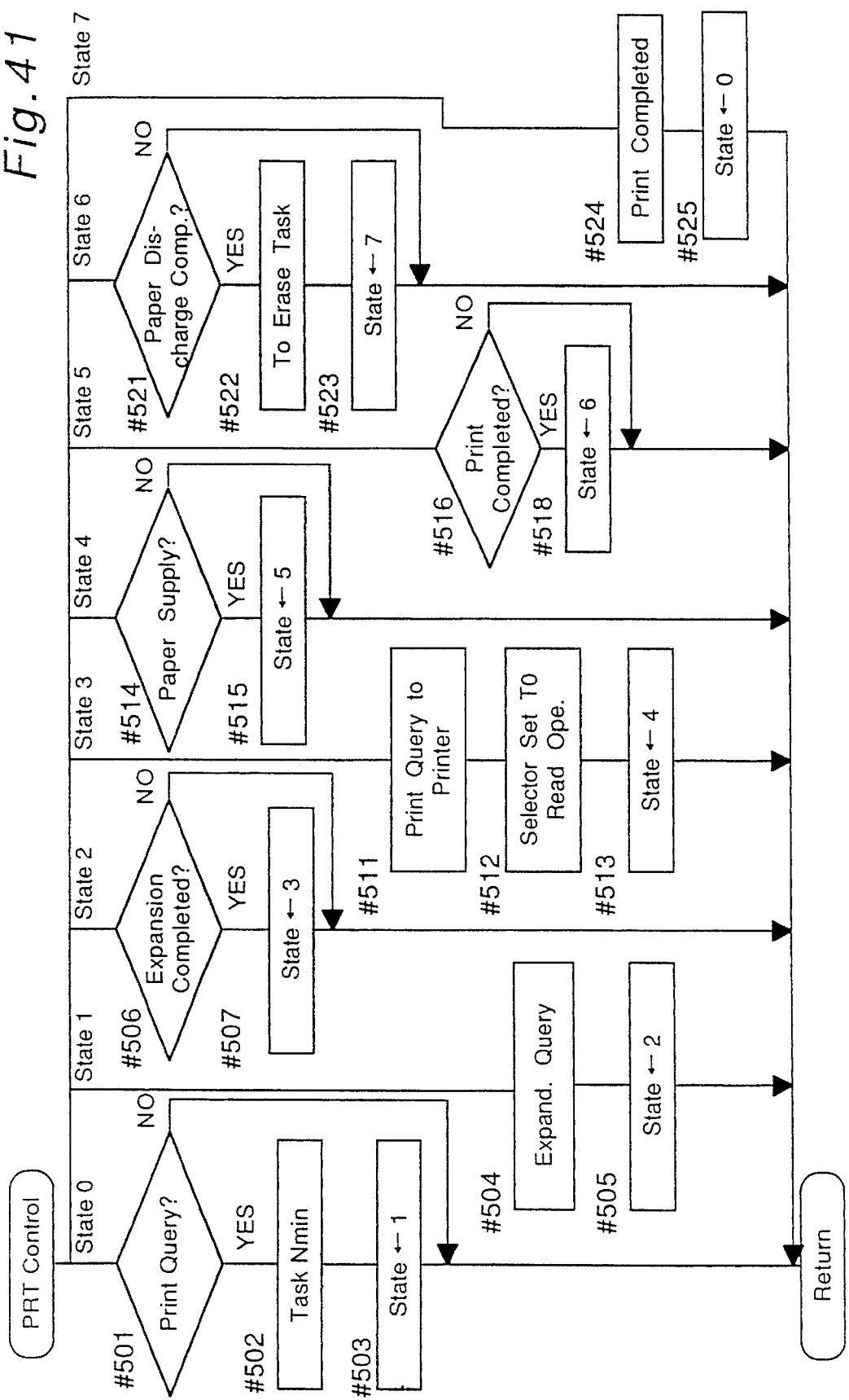
FIG. 41 is a flowchart showing a PRT control process.

FIG. 41 illustrates a flowchart for the PRT control process executed at step #452 of FIG. 39.

At state "0", if there is the print query as determined at step #501, the task Nmin is formulated at step 502 and the state is then rendered to be "1" at step #503. It is to be noted that the task for controlling the printer PRT is formulated for each print.

At state "1", the expansion query is issued at step #504 and the state is rendered to be "2" at step #505.

At state "2", if the expansion is completed as determined at step #506, the state is rendered to be "3" at step #507.

At state "3", the print query is issued to the printer PRT at step #511, the setting is performed at step #512 so that the state of connection of the selector 301 represents the memory mode read operation, and the state is then rendered to be "4" at step #513.

At state "4", when the paper supply is initiated at step #514, the state is rendered to be "5" at step #515.

At state "5", when the printing is completed as determined at step #516, the state is rendered to be "6" at step #518.

At state "6", when the paper discharge is completed as determined at step #521, the task is removed at step #522 since the printing operation subject to one recording paper has completely been finished, and the state is then rendered to be "7" at step #523.

At state "7", the print completion is determined at step #524 and the state is rendered to be "0" at step #525.

Figure 42:
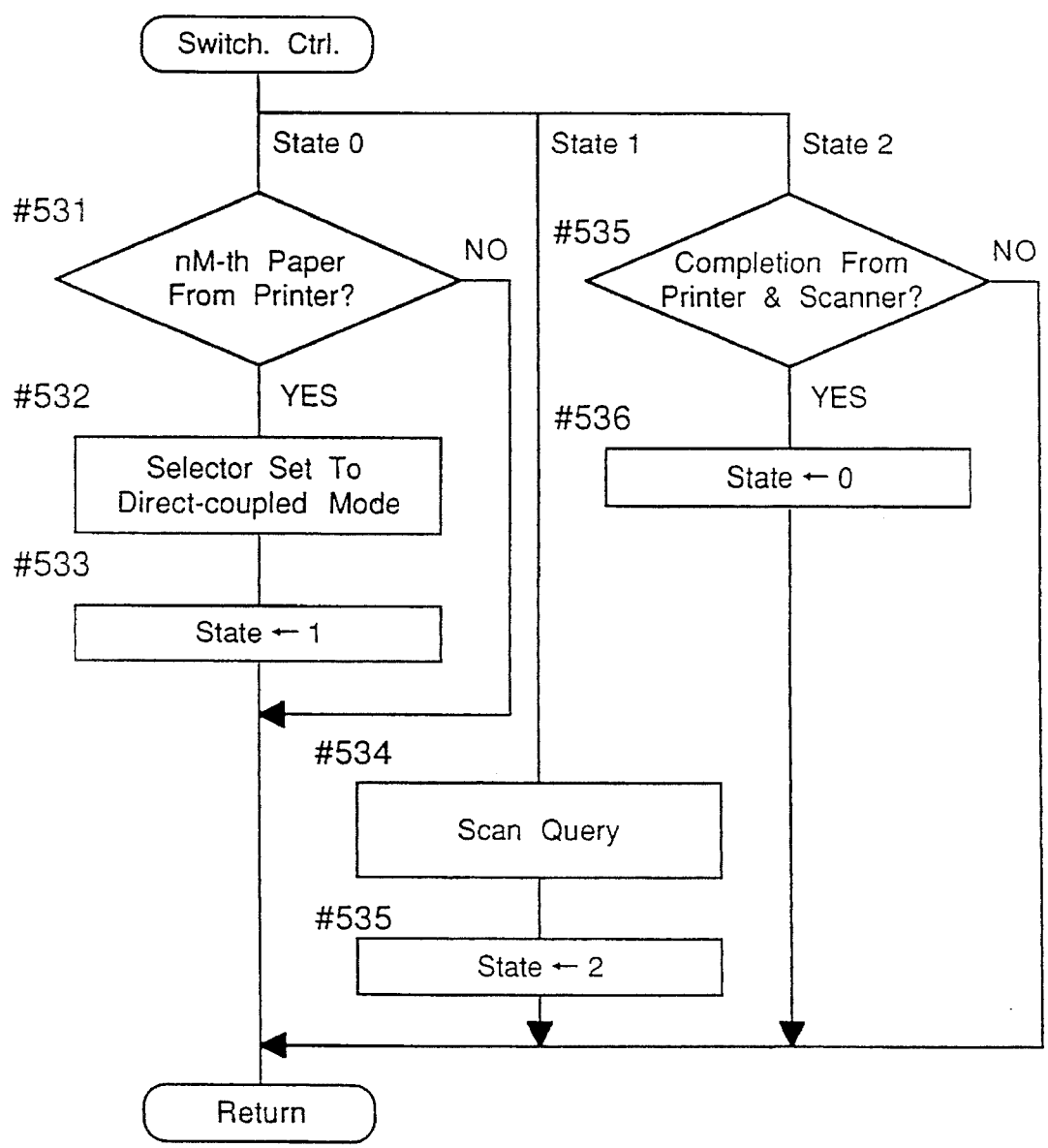
FIG. 42 is a flowchart showing a switching control process.
Figure 43A:
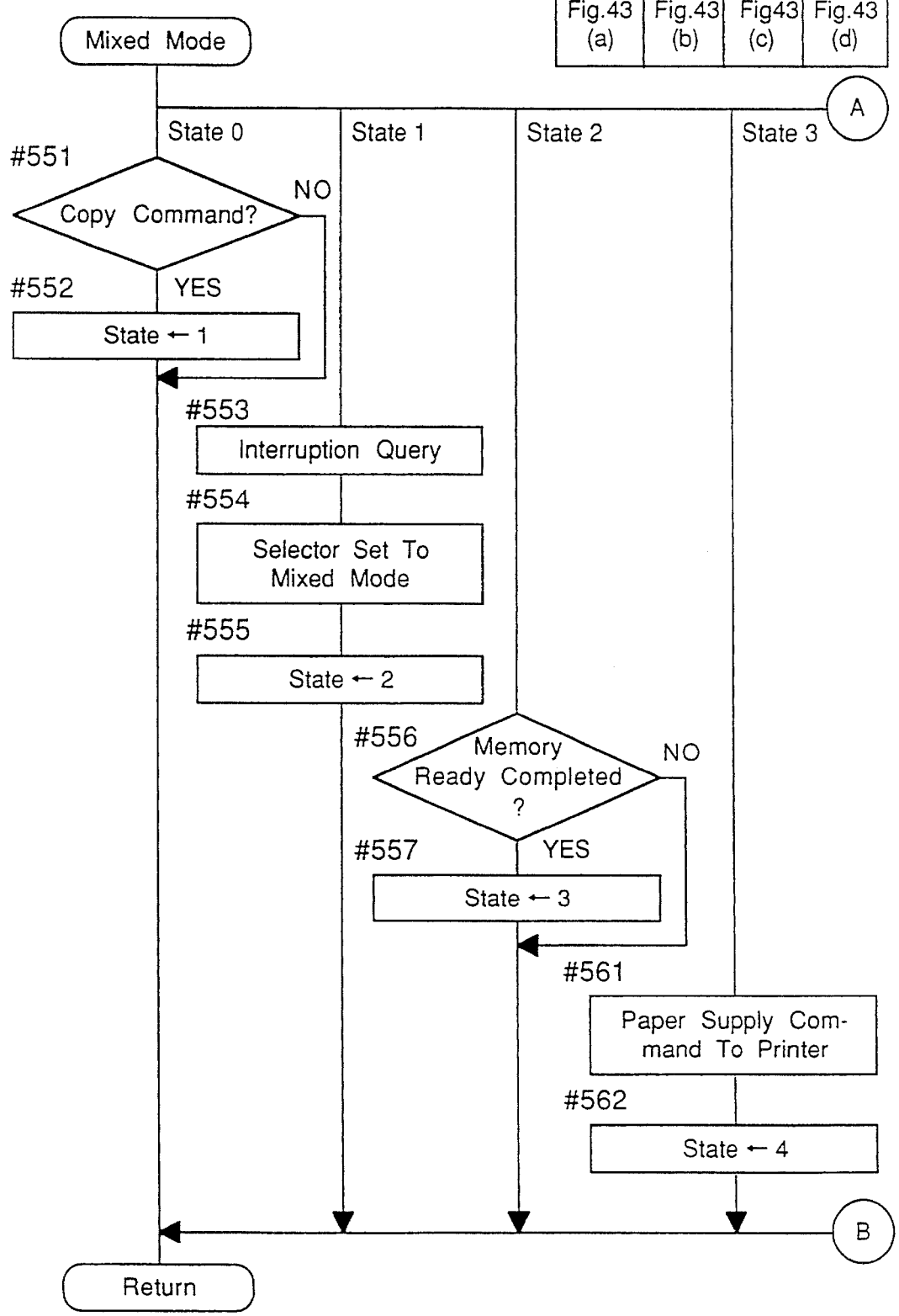
FIGS. 43(a)–(d) are a flowchart showing a mixed mode process.
Figure 43B:
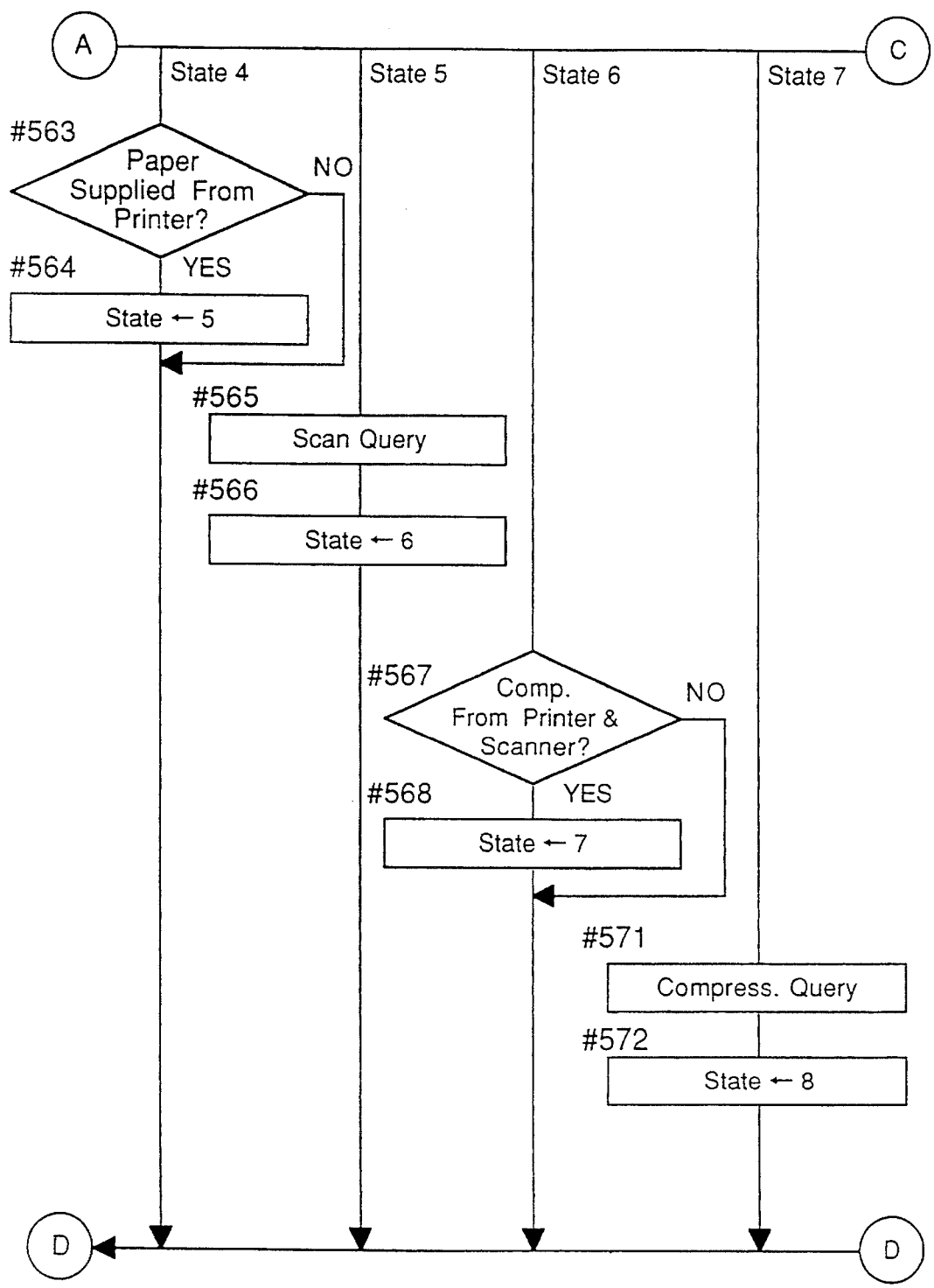
Figure 43C:
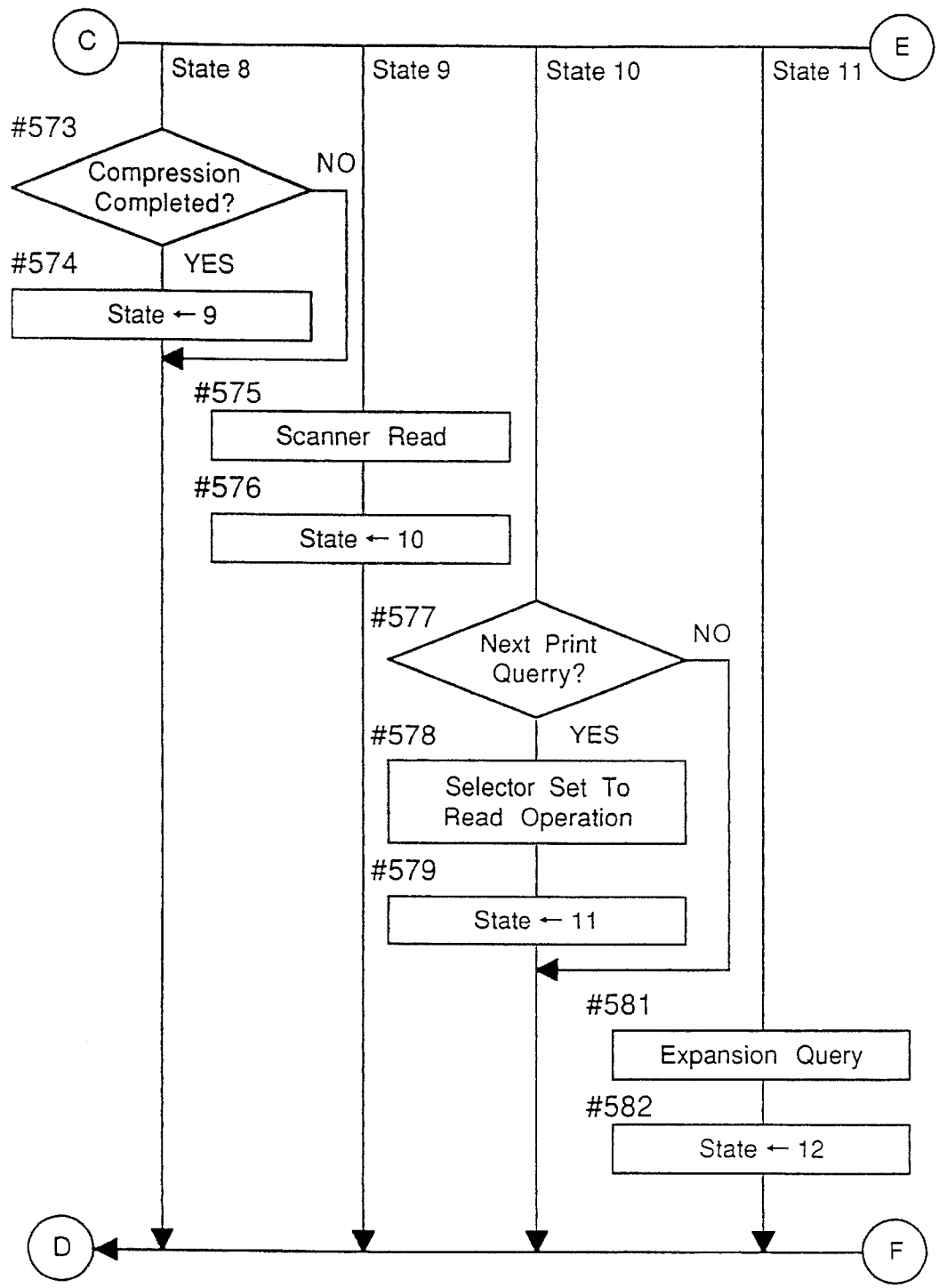
Figure 43D:
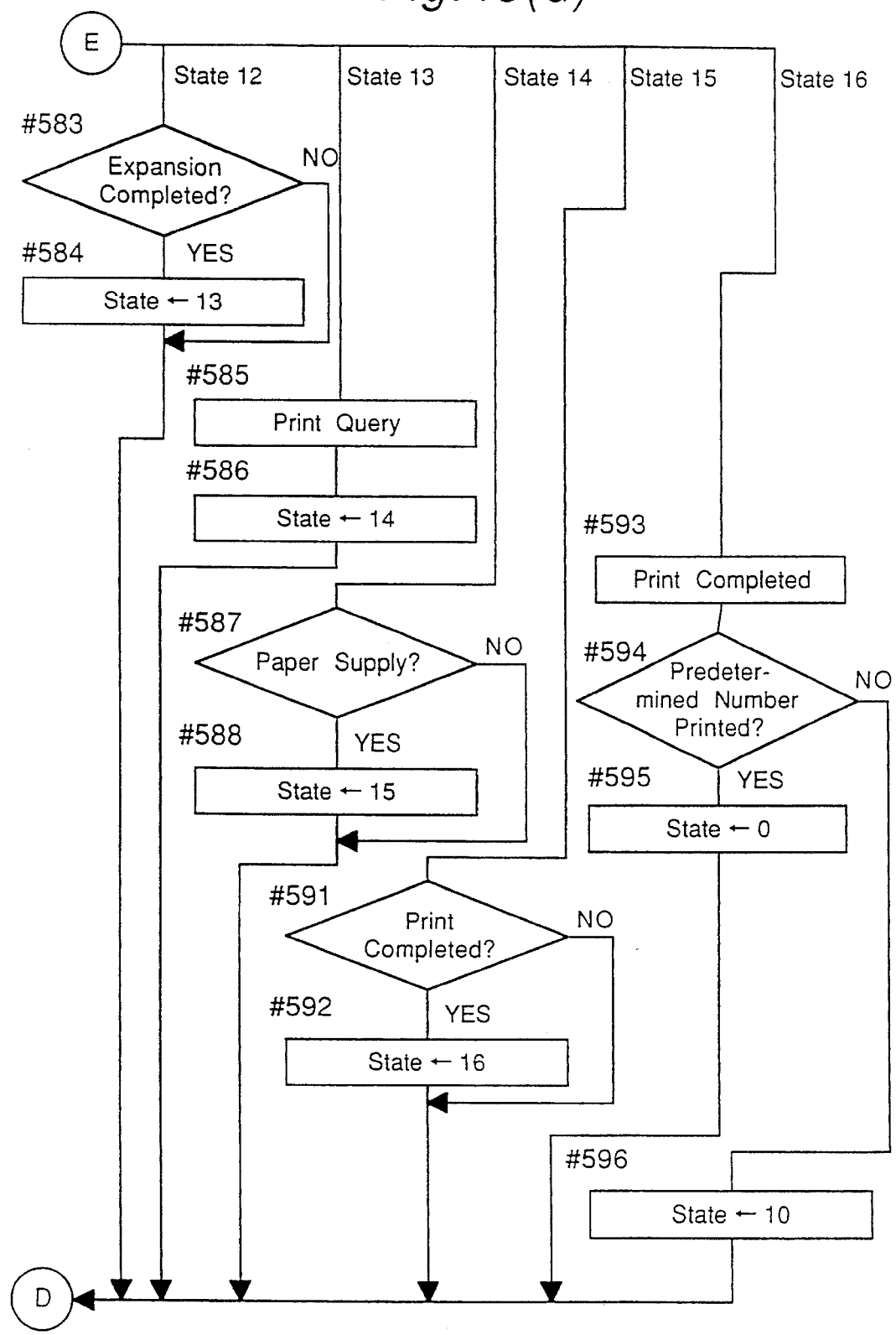

FIG. 42 illustrate a flowchart for the switching control process executed at step #453 of FIG. 39. According to this flowchart, at state "0", when the nM-th recording paper is supplied from the printer PRT as determined at step #531, the setting is performed at step #532 so that the state of connection of the selector 301 represents the direct-coupled mode, and the state is then rendered to be "1" at step #533.

At state "1", the scan query is issued to the scanner at step #534 and the state is rendered to be "2" at step #535.

At state "2", in the event that the termination signal is issued from the printer PRT and the scanner as determined at step #536, the state is rendered to be "0" at step #537.

FIG. 43 comprised of FIGS. 43(a) to 43(d) illustrates a flowchart for the mixed mode process executed at step #407 of FIG. 37. According to the flowchart shown in FIG. 43, at state "0", in the event of an occurrence of the copy command as determined at step #551, the state is rendered to be "1" at step #552.

At state "1", the write query to write in the image memory 304 is issued at step #553, the setting is then performed at step #554 so that the state of connection of the selector 301 represents the memory mode write operation, and the state is finally rendered to be "2" at step #555.

At state "2", if the memory ready completion is established as determined at step #556, the state is rendered to be "3" at step #557.

At state "3", the paper supply command is issued to the printer PRT at step #561 and the state is rendered to be "4" at step #562.

At state "4", when the paper supply signal is outputted from the printer PRT at step #563, the state is rendered to be "5" at step #564.

At state "5", the scan query is issued to the scanner at step #565 and the state is rendered to be "6" at step #566.

At state "6", in the event that the termination signal is issued from the printer PRT and the scanner as determined at step #567, the state is rendered to be "7" at step #568.

At state "7", the compression query is issued at step #571 and the state is rendered to be "8" at step #572.

At state "8", if the compression is completed as determined at step #573, the state is rendered to be "9" at step #574.

At state "9", if the reading by the scanner is completed as determined at step #575, the state is rendered to be "10" at step #576.

At state "10", the print query is issued to the printer PRT at step #577, the setting is performed at step #558 so that the state of connection of the selector 301 represents the memory mode read operation, and the state is finally rendered to be "11" at step #579.

At state "11", when the expansion query is issued as determined at step #581, the state is rendered to be "12" at step #582.

At state "12", when the expansion is completed as determined at step #583, the state is rendered to be "13" at step #584.

At state "13", the print query is issued to the printer PRT at step #585, and the state is rendered to be "15" at step #586.

At state "14", when the paper supply is initiated as determined at step #587, the state is rendered to be "15" at step #588.

At state "15", when the printing is completed as determined at step #591, the state is rendered to be "16" at step #592.

At state "16", the printing is deemed having been completed at step #593, and the state is then rendered to be "0" at step #595 when the required number of papers have been printed as determined at step #594. If some of the papers are left having been not printed as determined at step #594, the state is rendered to be "10" at step #596.

As hereinbefore fully described, in the copying machine 1 or 1a embodying the present invention, the hardware circuit blocks and the software architecture of the control unit 100 including the storage unit 30 are so configured and so structured that the memory mode write operation and the memory mode read operation can be performed independently and in parallel relation with each other whereupon, by selectively switching over to the direct-coupled mode for every predetermined number of papers during the copying cycle under the memory mode, the plurality of the documents can be copied at high speed, permitting the copying machine to exhibit a high productivity.

Thus, according to the present invention, by selectively switching during the copying cycle between the direct-coupled mode and the memory mode, the length of time required at any time other than the image formation can be advantageously reduced, permitting the copying machine as a whole to accomplish a high speed operation.

Although the present invention has been described in connection with the preferred embodiment thereof with reference to the accompanying drawings, it is to be noted that various changes and modifications are apparent to those skilled in the art. By way of example, arrangement may be made that a memory sorting in which a sorting of the image data takes place in a memory can be carried out during the execution under the memory mode so that, after a group of initial copies have been discharged, the next succeeding group of copies are turned 90 degrees before they are discharged.

Also, the image memory 304 employed in the storage unit 30 in the foregoing embodiment may comprise a plurality of memory chips or a single memory chip provided that the latter can be divided into a plurality of memory areas.

Again, in the foregoing embodiment, the circuit construction of the control unit 100 including the storage unit 30, the processing contents and shared functions of the various central processing units 101 to 108, the software architecture and the structure of the various component parts of the copying machine 1 or 1a may be varied in numerous ways without departing from the scope of the present invention.

Such changes and modifications are to be understood as included within the scope of the present invention as defined by the appended claims, unless they depart therefrom.

What is claimed is:

1. An image data processing method for an image forming apparatus comprising an image reading unit for reading an image to obtain an image data, an image forming unit for forming an image based on the image data and a storage unit for storing the image data, said method comprising the steps of selectively switching between a first mode, in which an image data reading operation and an image forming operation based on the image data are carried out simultaneously, and a second mode in which, after the image data are temporarily stored in the storage unit, the image forming operation is carried out by reading the image data from the storage unit, the first mode and the second mode are switched over to one another each time a predetermined number of copies has been made.

2. An image forming apparatus which comprises:

image reading means for reading an image of a document and for outputting image data descriptive of the image of the document;

image forming means for performing an image formation based on the image data;

storage means for storing the image data; and switching means for switching between a first and a second image forming mode depending on an image forming condition, wherein the image data output by the image reading means is directly transmitted to the image forming means by bypassing the storage means so that a reading operation of the reading means and an image forming operation of the image forming means are simultaneously performed in the first image forming mode, and the image data output by the image reading means is transmitted to the image forming means through the storage means so that the image forming operation is performed after completion of the image reading operation in the second image forming mode, wherein said image forming condition includes a document size, an image forming mode and the number of copies desired to be made.

3. An image forming apparatus which comprises:

image reading means for reading an image of a document and for outputting image data descriptive of the image of the document;

image forming means for performing an image formation based on the image data;

storage means for storing the image data; and switching means for switching between a first and a second image forming mode each time a predetermined number of copies has been made, said predetermined number being determined depending on an image forming condition, wherein the image data output by the image reading means is directly transmitted to the image forming means by bypassing the storage means so that a reading operation of the reading means and an image forming operation of the image forming means are simultaneously performed in the first image forming mode, and the image data output by the image reading means is transmitted to the image forming means through the storage means so that the image forming operation is performed after completion of the image reading operation in the second image forming mode.

4. The image forming apparatus as claimed in claim 3, wherein said switching means switches from the second image forming mode to the first image forming mode each time an image of every fourth document in the case where an image of each of first and second opposite sides of each of a plurality of documents is to be read.

5. The image forming apparatus as claimed in claim 3, further comprising:

an auto document feeder successively feeding a plurality of documents one by one to the image reading means;

a paper reversing path for refeeding a copied paper which has the image on one side thereof to the image forming means so that the image forming means forms an image on another side of the copied paper, wherein the paper reversing path stocks a predetermined number of papers depending on a paper size;

wherein said mode switching means switches from the second image forming mode to the first image forming mode each time the predetermined number of copies has been made, and switches from the first image forming mode over to the second image forming mode each time one copy has been made.

6. A digital copying apparatus which comprises:

an image reader for reading an image of a document and outputting image data descriptive of the image of the document;

an operation panel for setting an image condition by a manual input;

a printer for performing an image formation based on the image data;

image memory for storing the image data;

switching means for switching between a first image forming mode and a second image forming mode, wherein the image data output by the image reader is directly transmitted to the printer by bypassing the image memory so that a reading operation of the image reader and an image forming operation of the printer are simultaneously performed in the first image forming mode, and the image data read by the image reader is transmitted to the printer through the image memory so that the image forming operation is performed after completion of the image reading operation in the second image forming mode; and control means for controlling said switching means in order to select one of the first image forming mode and the second image forming mode according to the image forming condition set by manual input.

7. An image forming apparatus which comprises:

image reading means for reading an image of a document and for outputting image data descriptive of the image of the document;

detecting means for detecting a size of the document;

image forming means for performing an image formation based on the image data;

storage means for storing the image data;

switching means for switching between a first image forming mode and a second image forming mode, wherein the image data output by the image reading means is directly transmitted to the image forming means by bypassing the storage means so that a reading operation of the reading means and an image forming operation of the image forming means are simultaneously performed in the first image forming mode, and the image data read by the image reading means is transmitted to the image forming means through the storage means so that the image forming operation is performed after completion of the image reading operation in the second image forming mode; and control means for controlling said switching means in order to select one of the first image forming mode and the second image forming mode according to the document size detected by said detecting means.

8. An image forming apparatus which comprises:

image reading means for reading an image of a document and for outputting image data descriptive of the image of the document;

image forming means for performing an image formation based on the image data;

storage means for storing the image data;

an auto document feeder for successively feeding a plurality of documents one by one to the image reading means, and for reversing the document after one side of the document is read by the image reading means;

switching means for switching between a first image forming mode and a second image forming mode depending on a reversing operation of the auto document feeder, wherein the image data output by the image reading means is directly transmitted to the image forming means by bypassing the storage means so that a reading operation of the reading means and an image forming operation of the image forming means are simultaneously performed in the first image forming mode, and the image data read by the image reading means is transmitted to the image forming means through the storage means so that the image forming operation is performed after completion of the image reading operation in the second image forming mode.

* * * * *